(12) United States Patent
Briant

(10) Patent No.: US 11,906,801 B2
(45) Date of Patent: Feb. 20, 2024

(54) OPTICAL RECEPTACLE CONNECTOR FOR AN OPTICAL COMMUNICATION SYSTEM

(71) Applicant: TE Connectivity Solutions GmbH, Schaffhausen (CH)

(72) Inventor: Eric David Briant, Dillsburg, PA (US)

(73) Assignee: TE CONNECTIVITY SOLUTIONS GmbH, Schauffhausen (CH)

(*) Notice: Subject to any disclaimer, the term of this patent is extended or adjusted under 35 U.S.C. 154(b) by 22 days.

(21) Appl. No.: 17/843,592

(22) Filed: Jun. 17, 2022

(65) Prior Publication Data

US 2023/0026337 A1 Jan. 26, 2023

Related U.S. Application Data

(63) Continuation-in-part of application No. 17/711,766, filed on Apr. 1, 2022.

(60) Provisional application No. 63/225,851, filed on Jul. 26, 2021.

(51) Int. Cl.
*G02B 6/42* (2006.01)
*H01R 12/72* (2011.01)

(52) U.S. Cl.
CPC ......... *G02B 6/4293* (2013.01); *G02B 6/423* (2013.01); *G02B 6/4268* (2013.01); *G02B 6/4277* (2013.01); *G02B 6/4278* (2013.01); *H01R 12/721* (2013.01)

(58) Field of Classification Search
CPC .... G02B 6/423; G02B 6/4268; G02B 6/4277; G02B 6/4278; G02B 6/4246; G02B 6/4284; G02B 6/4292; G02B 6/3825; G02B 6/3838; G02B 6/3893; G02B 6/3897; G02B 6/3817; G02B 6/3885; G02B 6/421; G02B 6/4293; H01R 12/721; H01R 12/724; H01R 13/6594
See application file for complete search history.

(56) References Cited

U.S. PATENT DOCUMENTS

| | | | | |
|---|---|---|---|---|
| 4,036,430 A | * | 7/1977 | Eppich | G06K 13/08 235/483 |
| 5,369,263 A | * | 11/1994 | Nair | G06K 7/04 235/475 |
| 5,563,974 A | * | 10/1996 | Carpenter | G02B 6/25 385/139 |
| 6,282,350 B1 | * | 8/2001 | Takahashi | G02B 6/4243 385/94 |

(Continued)

*Primary Examiner* — Andrew Jordan

(57) ABSTRACT

An optical receptacle connector includes a receptacle housing having housing walls defining a contact cavity and an optical cavity. The receptacle housing includes an upper wall and a lower wall at a front of the receptacle housing defining a card slot receiving a mating edge of an optical module circuit board of a pluggable optical generator module. The upper wall includes an upper wall opening above the card slot. A contact assembly having receptacle contacts is received in the contact cavity to supply power to the pluggable optical generator module to operate a light source of the pluggable optical generator module. A receive optical connector is coupled to the receptacle housing above the upper wall opening and mated with a supply optical connector of the pluggable optical generator module to receive optical signals from the supply optical connector.

20 Claims, 16 Drawing Sheets

(56) References Cited

U.S. PATENT DOCUMENTS

| | | | | |
|---|---|---|---|---|
| 6,341,899 B1* | 1/2002 | Shirakawa | G02B 6/389 | 439/541.5 |
| 6,371,664 B2* | 4/2002 | Takahashi | G02B 6/4239 | 385/94 |
| 6,519,406 B1* | 2/2003 | Fukuyama | G02B 6/3839 | 385/137 |
| 6,705,766 B2* | 3/2004 | Lecomte | G02B 6/3891 | 385/60 |
| 6,885,797 B2* | 4/2005 | Lee | G02B 6/4292 | 385/39 |
| 7,331,718 B2* | 2/2008 | Yazaki | G02B 6/3825 | 385/78 |
| 7,511,258 B2* | 3/2009 | Bowen | G02B 6/423 | 385/52 |
| 7,942,589 B2* | 5/2011 | Yazaki | G02B 6/3825 | 385/72 |
| 8,579,662 B2* | 11/2013 | Briant | H01R 12/716 | 439/607.08 |
| 8,747,158 B2* | 6/2014 | Szczesny | H01R 13/6586 | 439/607.07 |
| 9,166,317 B2* | 10/2015 | Briant | H01R 12/737 | |
| 9,210,817 B2* | 12/2015 | Briant | H01R 13/508 | |
| 9,213,147 B2* | 12/2015 | Mitchell | G02B 6/3869 | |
| 9,235,018 B2* | 1/2016 | McColloch | G02B 6/4246 | |
| 9,250,405 B2* | 2/2016 | Tong | G02B 6/4269 | |
| 9,279,942 B2* | 3/2016 | Li | G02B 6/3888 | |
| 9,389,377 B2* | 7/2016 | Tong | G02B 6/4292 | |
| 9,391,407 B1* | 7/2016 | Bucher | H01R 13/659 | |
| 9,484,678 B1* | 11/2016 | Briant | H01R 13/659 | |
| 9,547,141 B2* | 1/2017 | Wu | G02B 6/4277 | |
| 9,608,377 B1* | 3/2017 | Phillips | H01R 13/7172 | |
| 9,620,906 B1* | 4/2017 | Briant | H01R 12/722 | |
| 9,666,997 B1* | 5/2017 | Henry | H01R 13/659 | |
| 9,673,570 B2* | 6/2017 | Briant | G02B 6/4269 | |
| 9,678,286 B2* | 6/2017 | Valencia | G02B 6/3883 | |
| 9,829,643 B2* | 11/2017 | Kadar-Kallen | G02B 6/3809 | |
| 9,851,518 B2* | 12/2017 | Chan | B32B 37/18 | |
| 9,935,403 B1* | 4/2018 | Briant | H05K 9/0018 | |
| 10,007,075 B2* | 6/2018 | Maeda | G02B 6/4256 | |
| 10,104,760 B1* | 10/2018 | Briant | G02B 6/4284 | |
| 10,104,793 B2* | 10/2018 | Briant | H05K 9/0058 | |
| 10,128,618 B1* | 11/2018 | Briant | H01R 13/04 | |
| 10,490,952 B2* | 11/2019 | Briant | H01R 12/7005 | |
| 10,502,909 B2* | 12/2019 | Minota | G02B 6/42 | |
| 10,559,920 B1* | 2/2020 | Champion | H01R 12/721 | |
| 10,564,363 B1* | 2/2020 | Corl | G02B 6/262 | |
| 10,581,210 B2* | 3/2020 | Pogash | H01R 13/741 | |
| 10,680,364 B2* | 6/2020 | Champion | H01R 13/6582 | |
| 10,680,388 B2* | 6/2020 | Champion | H01R 12/714 | |
| 10,718,914 B2* | 7/2020 | Li | G02B 6/4219 | |
| 10,840,645 B2* | 11/2020 | Briant | G02B 6/0006 | |
| 10,873,161 B2* | 12/2020 | Henry | H01R 12/716 | |
| 10,923,843 B1* | 2/2021 | Henry | H01R 12/716 | |
| 11,011,861 B1* | 5/2021 | Briant | G02B 6/4292 | |
| 11,125,958 B2* | 9/2021 | Champion | G02B 6/428 | |
| 11,211,743 B2* | 12/2021 | Briant | H01R 13/6591 | |
| 11,215,771 B2* | 1/2022 | Minota | G02B 6/4454 | |
| 11,264,748 B2* | 3/2022 | McClelland | H01R 12/7082 | |
| 11,349,237 B2* | 5/2022 | Blackburn | H01R 12/57 | |
| 11,357,569 B2* | 6/2022 | Jimenez | A61B 5/486 | |
| 11,374,363 B2* | 6/2022 | Rita | H01R 13/6691 | |
| 11,413,660 B2* | 8/2022 | Tourigny | B08B 11/00 | |
| 11,456,567 B2* | 9/2022 | Blackburn | H01R 12/73 | |
| 11,525,969 B2* | 12/2022 | Minota | G02B 6/42 | |
| 11,573,612 B2* | 2/2023 | Liang | G06F 1/1662 | |
| 11,585,986 B2* | 2/2023 | Corl | G02B 6/3803 | |
| 11,621,526 B2* | 4/2023 | Phillips | H01R 12/716 | 439/607.01 |
| 11,668,885 B2* | 6/2023 | Minota | G02B 6/4278 | 385/92 |
| 11,747,283 B2* | 9/2023 | Carothers | G01N 33/54373 | 422/82.11 |
| 2001/0024549 A1* | 9/2001 | Takahashi | G02B 6/4257 | 385/92 |
| 2003/0138217 A1* | 7/2003 | Lecomte | G02B 6/3891 | 385/78 |
| 2004/0141694 A1* | 7/2004 | Lee | G02B 6/4292 | 385/78 |
| 2005/0089027 A1* | 4/2005 | Colton | H04Q 11/0005 | 370/380 |
| 2005/0141817 A1* | 6/2005 | Yazaki | G02B 6/3825 | 385/78 |
| 2006/0062040 A1* | 3/2006 | Dobashi | G03H 1/26 | 359/31 |
| 2006/0097137 A1* | 5/2006 | Bowen | G02B 6/423 | 250/216 |
| 2008/0292246 A1* | 11/2008 | Yazaki | G02B 6/3874 | 385/60 |
| 2009/0080839 A1* | 3/2009 | Yazaki | G02B 6/3874 | 385/72 |
| 2010/0149073 A1* | 6/2010 | Chaum | G02B 27/017 | 345/8 |
| 2011/0303241 A1* | 12/2011 | Tourigny | B08B 11/00 | 134/9 |
| 2012/0033920 A1* | 2/2012 | Haley | G02B 6/3885 | 385/78 |
| 2013/0114931 A1* | 5/2013 | Mitchell | G02B 6/3869 | 385/78 |
| 2013/0115814 A1* | 5/2013 | Briant | H01R 12/721 | 439/607.08 |
| 2013/0294732 A1* | 11/2013 | Li | G02B 6/4214 | 385/83 |
| 2013/0322887 A1* | 12/2013 | McColloch | G02B 6/423 | 398/140 |
| 2013/0337667 A1* | 12/2013 | Szczesny | H01R 4/04 | 439/92 |
| 2014/0178015 A1* | 6/2014 | Tong | G02B 6/4278 | 385/88 |
| 2015/0036984 A1* | 2/2015 | Wang | G02B 6/423 | 385/88 |
| 2015/0098680 A1* | 4/2015 | Leigh | G02B 6/4292 | 385/88 |
| 2015/0223349 A1* | 8/2015 | Briant | G02B 6/4284 | 361/737 |
| 2015/0236437 A1* | 8/2015 | Briant | H01R 12/737 | 439/636 |
| 2015/0277123 A1* | 10/2015 | Chaum | G02B 27/017 | 348/62 |
| 2015/0338583 A1* | 11/2015 | Valencia | G02B 6/3885 | 385/59 |
| 2016/0062065 A1* | 3/2016 | Wu | G02B 6/4277 | 385/89 |
| 2016/0131860 A1* | 5/2016 | Tong | G02B 6/4262 | 385/89 |
| 2016/0187598 A1* | 6/2016 | Chan | G02B 6/32 | 156/60 |
| 2016/0214145 A1* | 7/2016 | Tourigny | B08B 1/006 | |
| 2016/0238804 A1* | 8/2016 | Li | G02B 6/4295 | |
| 2016/0269118 A1* | 9/2016 | Zbinden | G02B 6/4232 | |
| 2016/0327761 A1* | 11/2016 | Zbinden | G02B 6/4293 | |
| 2017/0085035 A1* | 3/2017 | Briant | G02B 6/4269 | |
| 2017/0125952 A1* | 5/2017 | Briant | H01R 13/6581 | |
| 2018/0049348 A1* | 2/2018 | Bucher | G02B 6/4271 | |
| 2018/0074274 A1* | 3/2018 | Maeda | G02B 6/4256 | |
| 2018/0149814 A1* | 5/2018 | Minota | G02B 6/4454 | |
| 2018/0205184 A1* | 7/2018 | Briant | H01R 13/518 | |
| 2018/0206353 A1* | 7/2018 | Briant | H05K 5/0069 | |
| 2019/0210071 A1* | 7/2019 | Tourigny | B08B 11/00 | |
| 2019/0288422 A1* | 9/2019 | Champion | H01R 13/6587 | |
| 2019/0288457 A1* | 9/2019 | Champion | H01R 13/659 | |
| 2020/0003973 A1* | 1/2020 | Li | G02B 6/4248 | |
| 2020/0036142 A1* | 1/2020 | Pogash | H01R 13/741 | |
| 2020/0052439 A1* | 2/2020 | Champion | H01R 12/737 | |
| 2020/0103605 A1* | 4/2020 | Minota | G02B 6/4457 | |
| 2020/0136286 A1* | 4/2020 | Mcclelland, II | H01R 24/60 | |
| 2020/0225420 A1* | 7/2020 | Corl | G02B 6/3803 | |
| 2020/0274295 A1* | 8/2020 | Briant | G02B 6/428 | |
| 2020/0301084 A1* | 9/2020 | Champion | G02B 6/428 | |
| 2020/0358228 A1* | 11/2020 | Henry | H01R 13/6595 | |
| 2021/0066859 A1* | 3/2021 | Rita | H01R 13/6691 | |
| 2021/0072471 A1* | 3/2021 | Li | G02B 6/3838 | |

(56) References Cited

U.S. PATENT DOCUMENTS

| | | | |
|---|---|---|---|
| 2021/0107037 A1* | 4/2021 | Tourigny | B08B 11/00 |
| 2021/0126392 A1* | 4/2021 | Briant | H01R 13/514 |
| 2021/0212755 A1* | 7/2021 | Jimenez | A61B 5/6856 |
| 2021/0265754 A1* | 8/2021 | Blackburn | H01R 12/721 |
| 2021/0265792 A1* | 8/2021 | Blackburn | H01R 24/60 |
| 2021/0293716 A1* | 9/2021 | Carothers | G01N 21/8483 |
| 2021/0296818 A1* | 9/2021 | Briant | H01R 13/6691 |
| 2022/0011829 A1* | 1/2022 | Liang | G06F 1/1658 |
| 2022/0082766 A1* | 3/2022 | Minota | G02B 6/4278 |
| 2022/0137308 A1* | 5/2022 | Minota | G02B 6/4246 |
| | | | 385/92 |
| 2022/0368082 A1* | 11/2022 | Phillips | H05K 7/20 |
| 2023/0025650 A1* | 1/2023 | Phillips | H01R 12/721 |
| 2023/0026337 A1* | 1/2023 | Briant | G02B 6/4268 |
| 2023/0029294 A1* | 1/2023 | Briant | G02B 6/3885 |
| 2023/0036226 A1* | 2/2023 | Wang | G02B 6/3837 |
| 2023/0039891 A1* | 2/2023 | Jimenez | A61B 5/0084 |
| 2023/0067157 A1* | 3/2023 | Minota | G02B 6/428 |
| 2023/0168442 A1* | 6/2023 | Dannoux | G02B 6/3839 |
| | | | 385/78 |

* cited by examiner

OPTICAL RECEPTACLE CONNECTOR FOR AN OPTICAL COMMUNICATION SYSTEM

CROSS REFERENCE TO RELATED APPLICATIONS

This application is a continuation-in-part application of U.S. application Ser. No. 17/711,766, filed 1 Apr. 2022, titled "OPTICAL RECEPTACLE CONNECTOR FOR AN OPTICAL COMMUNICATION SYSTEM", and claims benefit of U.S. Provisional Application No. 63/225,851, filed 26 Jul. 2021, titled "OPTICAL RECEPTACLE CONNECTOR FOR AN OPTICAL COMMUNICATION SYSTEM", the subject matter of each of which is herein incorporated by reference in its entirety.

BACKGROUND OF THE INVENTION

The subject matter herein relates generally to communication systems.

Some communication systems utilize transceivers or plug modules as I/O modules for data communication. The plug module is pluggably received in a receptacle cage of a receptacle assembly to interconnect the plug module with another component, such as a host circuit board through a communication connector mounted to the host circuit board. Due to the high speed of data transmission and the length of the traces on the host circuit board between the communication connector and other components mounted to the host circuit board, some known communication systems use optical signals transmitted through optical fibers. The optical fibers extend from the plug module and extend from the receptacle assembly. Incorporating the light generation components into the communication system is difficult. Multiple components and optical fibers are needed to transmit the light between the source-component and the end-component leading to increased system components and increased cost.

A need remains for an efficient communication system.

BRIEF DESCRIPTION OF THE INVENTION

In one embodiment, an optical receptacle connector for an optical communication system is provided and includes a receptacle housing having housing walls defining a contact cavity and an optical cavity. The receptacle housing includes an upper wall and a lower wall at a front of the receptacle housing defining a card slot configured to receive a mating edge of an optical module circuit board of a pluggable optical generator module. The upper wall includes an upper wall opening above the card slot. The optical receptacle connector includes a contact assembly coupled to the receptacle housing. The contact assembly includes receptacle contacts received in the contact cavity. The receptacle contacts extend into the card slot to electrically connect to the optical module circuit board of the pluggable optical generator module. The receptacle contacts configured to supply power to the pluggable optical generator module to operate a light source of the pluggable optical generator module. The optical receptacle connector includes a receive optical connector coupled to the receptacle housing. The receive optical connector positioned above the upper wall opening. The receive optical connector includes a ferrule holding at least one optical fiber. The ferrule has a mating end configured to be mated with a supply optical connector of the pluggable optical generator module to receive optical signals from the supply optical connector. The receive optical connector includes an optical cable extends from the ferrule.

In another embodiment, an optical receptacle connector for an optical communication system is provided and includes a receptacle housing having housing walls defining a contact cavity and an optical cavity. The receptacle housing includes an upper wall and a lower wall at a front of the receptacle housing defining a card slot configured to receive a mating edge of an optical module circuit board of a pluggable optical generator module. The upper wall includes an upper wall opening above the card slot. The optical receptacle connector includes a contact assembly coupled to the receptacle housing. The contact assembly includes receptacle contacts received in the contact cavity. The receptacle contacts extend into the card slot to electrically connect to the optical module circuit board of the pluggable optical generator module. The receptacle contacts configured to supply power to the pluggable optical generator module to operate a light source of the pluggable optical generator module. The optical receptacle connector includes a receive optical connector coupled to the receptacle housing. The receive optical connector includes a top and a bottom. The receive optical connector positioned above the card slot with the bottom of the receive optical connector facing the contacts across the upper wall opening and the card slot. The receive optical connector includes a ferrule holding at least one optical fiber. The ferrule has a mating end configured to be mated with a supply optical connector of the pluggable optical generator module to receive optical signals from the supply optical connector. The receive optical connector includes an optical cable extends from the ferrule.

In a further embodiment, a communication system is provided and includes a receptacle cage having cage walls defining a module channel. The module channel extends between a front end and a rear end of the receptacle cage. The module channel is open at the front end to receive a pluggable optical generator module. The communication system includes an optical receptacle connector located in the module channel for electrical and optical connection with the pluggable optical generator. The optical receptacle connector includes a receptacle housing holding a contact assembly and a receive optical connector. The receptacle housing includes housing walls defining a contact cavity and an optical cavity. The receptacle housing includes an upper wall and a lower wall at a front of the receptacle housing defining a card slot at a front of the receptacle housing configured to receive a mating edge of an optical module circuit board of the pluggable optical generator module. The upper wall includes an upper wall opening above the card slot. The contact assembly includes receptacle contacts received in the contact cavity of the receptacle housing. The receptacle contacts extends into the card slot to electrically connect to the optical module circuit board of the pluggable optical generator module. The receptacle contacts configured to supply power to the pluggable optical generator module to operate a light source of the pluggable optical generator module. The receive optical connector includes a ferrule received in the optical cavity of the receptacle housing. The ferrule holds at least one optical fiber. The ferrule has a mating end configured to be mated with a supply optical connector of the pluggable optical generator module to receive optical signals from the supply optical connector. The receive optical connector includes an optical cable extends from the ferrule. The receive optical connector is positioned above the upper wall opening.

DETAILED DESCRIPTION OF THE INVENTION

Figure 1:
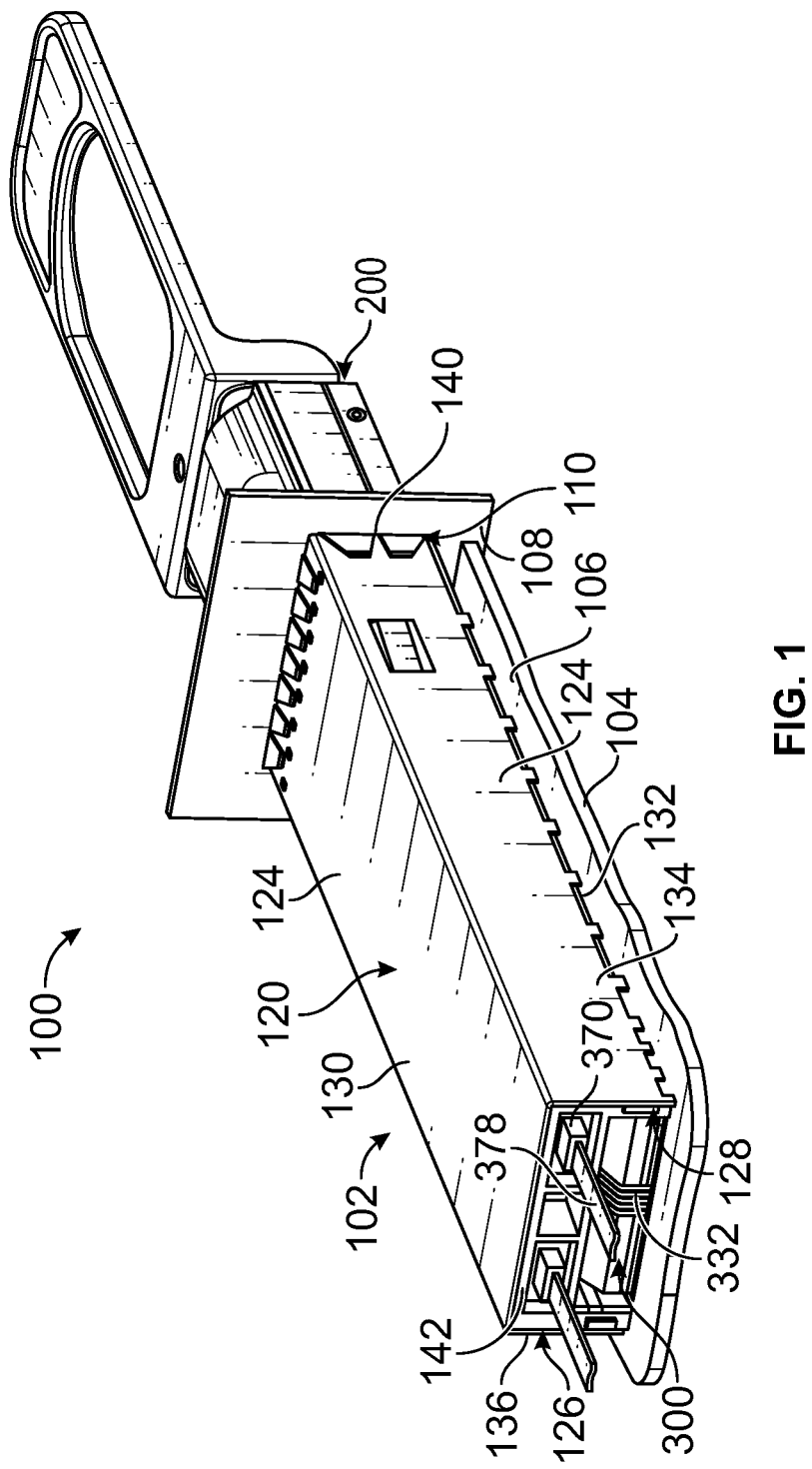
FIG. 1 is a perspective view of an optical communication system formed in accordance with an exemplary embodiment.

FIG. 1 is a perspective view of an optical communication system 100 formed in accordance with an exemplary embodiment. The optical communication system 100 includes a receptacle module 102 and one or more pluggable optical generator modules 200 configured to be electrically connected to the receptacle module 102. The pluggable optical generator module 200 (may be referred to hereinafter as pluggable module 200) is used to generate optical signals. For example, the pluggable optical generator module 200 may include a light source, such as a laser generator, for generating the optical signals, which are transmitted from the pluggable optical generator module 200 to the receptacle module 102. The receptacle module 102 receives the optical signals from the pluggable optical generator module 200. In an exemplary embodiment, the receptacle module 102 supplies power to the pluggable optical generator module 200, which is used to operate the light source.

The receptacle module 102 includes a receptacle cage 120 and one or more optical receptacle connectors 300 received in the receptacle cage 120. The optical receptacle connector 300 is configured to be coupled to the pluggable optical generator module 200. The pluggable optical generator module 200 is pluggable into the receptacle cage 120 to mate with the optical receptacle connector 300 at a separable mating interface. When mated, electrical power is supplied from the optical receptacle connector 300 to the pluggable optical generator module 200. When mated, optical signals, generated by the pluggable optical generator module 200, are transmitted to the optical receptacle connector 300 and may be transmitted from the optical receptacle connector 300 through optical cables. The pluggable optical generator module 200 may be unmated from the optical receptacle connector 300 and may be removed from the receptacle cage 120, such as for repair or replacement.

In an exemplary embodiment, the receptacle module 102 is mounted to a support structure 104. For example, in the illustrated embodiment, the support structure 104 may include a circuit board 106. The receptacle module 102 is mounted to the circuit board 106. The optical receptacle connector 300 is electrically connected to the circuit board 106, such as to one or more circuits. In an exemplary embodiment, the circuit board 106 supplies power to the optical receptacle connector 300. The circuit board 106 may provide a ground reference for the optical receptacle connector 300. The circuit board 106 may provide data signals to the optical receptacle connector 300.

In an exemplary embodiment, the support structure 104 may additionally, or alternatively, include a panel 108. The panel 108 may be a rack panel in a server in various embodiments. In other various embodiments, the panel 108 may include a cabinet or chassis of an electrical device, such as a computer. The panel 108 may be another type of support structure in alternative embodiments. The panel 108 may be a metal plate or sheet in various embodiments. In an exemplary embodiment, the panel 108 is oriented perpendicular to the mating direction of the modules 200, 300. The panel 108 includes a panel opening 110 therethrough. The panel opening 110 is open between a front surface and a rear surface of the panel 108. A portion of the receptacle module 102 may extend through the panel opening 110.

The receptacle module 102 includes the receptacle cage 120. The optical receptacle connector 300 is configured to be loaded into a rear of the receptacle cage 120. The pluggable optical generator module 200 is configured to be loaded into a front of the receptacle cage 120. The pluggable optical generator module 200 is mated to the optical receptacle connector 300 inside the receptacle cage 120. In various embodiments, the receptacle cage 120 is enclosed and provides electrical shielding for the optical receptacle connector 300 and the pluggable optical generator module 200.

The receptacle cage 120 includes a plurality of cage walls 124 that define a cavity 126. The cavity 126 may be subdivided by corresponding cage walls 124 to form one or more module channels 128 for receipt of corresponding pluggable optical generator modules 200 and optical receptacle connectors 300. The receptacle cage 120 includes front ports open at the front of the receptacle cage 120 to receive the pluggable optical generator modules 200 and rear ports open at the rear of the receptacle cage 120 to receive the optical receptacle connectors 300. In the illustrated embodiment, the cavity 126 includes a single module channel 128. However, additional cage walls 124 may be provided to form a cavity 126 divided into more module channels, such as two module channels 128, four module channels 128 or more. The module channels 128 may be stacked vertically (for example, an upper module channel and a lower module channel) or may be stacked side-by-side. The cage walls 124 may be walls defined by solid sheets, perforated walls to allow airflow therethrough, or walls with cutouts, such as for a heat transfer device such as a heatsink, heat spreader, cold plate, and the like to pass therethrough. In the illustrated embodiment, the cage walls 124 are stamped and formed walls defining shielding walls.

In an exemplary embodiment, the cage walls 124 of the receptacle cage 120 include a top wall 130, a bottom wall 132, a first side wall 134, and a second side wall 136 for each module channel 128, which may be outer or exterior walls. In an exemplary embodiment, the cage walls 124 include cage mounting tabs for mounting the receptacle cage 120 to the circuit board 106. For example, the cage mounting tabs may be press-fit pins configured to be press-fit into vias in the circuit board 106. The receptacle cage 120 extends between a front end 140 and a rear end 142. A front port is provided at the front end 140 providing access to the module channel 128 for the pluggable optical generator module 200. A rear port is provided at the rear end 142 providing access to the module channel 128 for the optical receptacle connector 300. The cage walls 124 may include divider walls separating the cavity 126 into multiple module channels 128 (for example, a horizontal divider or a vertical divider).

Figure 2:
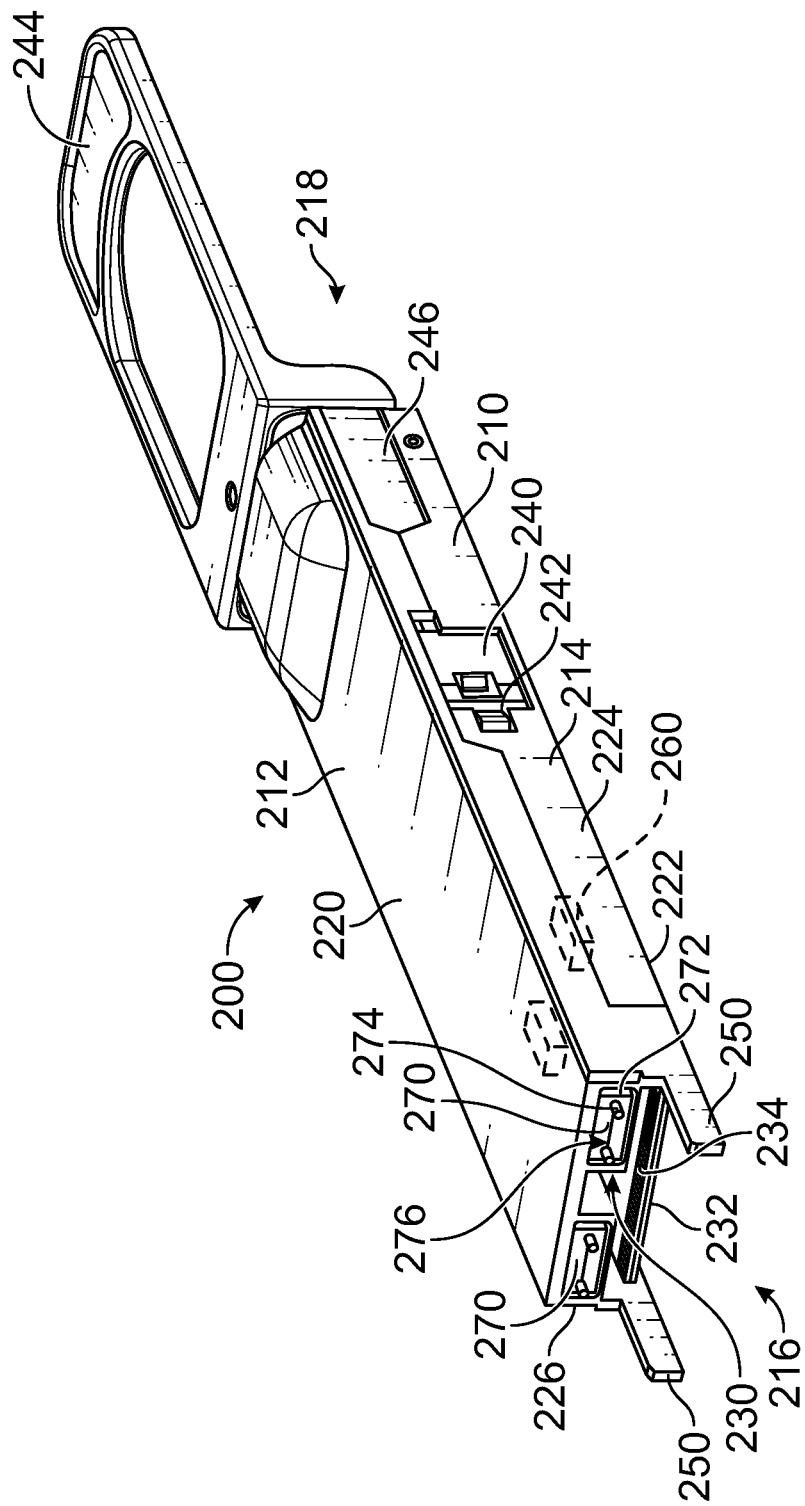
FIG. 2 is a perspective view of the pluggable optical generator module in accordance with an exemplary embodiment.

FIG. 2 is a perspective view of the pluggable optical generator module 200 in accordance with an exemplary embodiment. The pluggable optical generator module 200 includes a plug housing 210 defined by one or more shells, such as an upper shell 212 and a lower shell 214. In an exemplary embodiment, the plug housing 210 is manufactured from a conductive material, such as a metal material. The plug housing 210 provides electrical shielding for the pluggable optical generator module 200. The plug housing 210 may be thermally conductive to transfer heat from internal components to the exterior of the plug housing 210. The plug housing 210 includes a mating end 216 at a front of the pluggable optical generator module 200 and a rear end 218 opposite the mating end 216. The mating end 216 is configured to be inserted into the module channel 128 (shown in FIG. 1).

The plug housing 210 includes a top wall 220, a bottom wall 222, a first side wall 224 extending between the top wall 220 and the bottom wall 222, and a second side wall 226 extending between the top wall 220 and the bottom wall 222. The plug housing 210 surrounds a module cavity 228. The module cavity 228 houses electrical components of the pluggable optical generator module 200.

In an exemplary embodiment, the pluggable optical generator module 200 includes an optical module circuit board 230 in the module cavity 228. The circuit board 230 may be accessible at the mating end 216. The circuit board 230 is configured to be coupled to the optical receptacle connector 300 (shown in FIG. 3). For example, a mating edge 232 of the circuit board 230 may be plugged into the optical receptacle connector 300, such as in a card slot of the optical receptacle connector 300. The circuit board 230 includes electrical components used for operating and/or using the pluggable optical generator module 200. For example, the circuit board 230 may have conductors, traces, pads, electronics, sensors, controllers, switches, inputs, outputs, and the like to form various circuits. In the illustrated embodiment, the circuit board 230 includes contact pads 234 at the mating edge 232. The contact pads 234 may be provided at the upper surface and/or the lower surface. The contact pads 234 are configured to be electrically connected to the optical receptacle connector 300.

The pluggable optical generator module 200 includes a plug latch 240 for releasing the pluggable optical generator module 200 from the receptacle cage 120. The plug latch 240 includes a plug latching feature 242 (shown in phantom) configured to secure the pluggable optical generator module 200 to the receptacle cage 120. The plug latching feature 242 may be a latching finger. The plug latching feature 242 may be deflectable in various embodiments, such as to release from the receptacle cage 120. In an exemplary embodiment, the plug latch 240 includes a pull tab 244 extending from one or more latch arms 246. The pull tab 244 is configured to be pulled to release the plug latch 240 from the receptacle cage 120 and allow removal of the pluggable optical generator module 200 from the receptacle cage 120.

In an exemplary embodiment, the pluggable optical generator module 200 includes a guide feature 250. The guide feature 250 is used to guide mating with the optical receptacle connector 300. For example, the guide feature 250 interfaces with a complimentary guide feature of the optical receptacle connector 300 to position the pluggable optical generator module 200 relative to the optical receptacle connector 300. The guide feature 250 may be used to vertically position and/or horizontally position the pluggable optical generator module 200 relative to the optical receptacle connector 300. In the illustrated embodiment, the guide feature 250 is a rail extending forward from the front of the pluggable optical generator module 200. The rail may include chamfered edges that form lead-in surfaces and guide mating. Other types of guide features may be used in alternative embodiments, such as a pin, a tab, a groove, a slot, and the like.

In an exemplary embodiment, the pluggable optical generator module 200 includes a light source 260 (shown in phantom). The light source 260 generates light, which may be transmitted along optical fibers. The light source may be a laser generator. The light source 260 is electrically connected to the contact pads 234. In an exemplary embodiment, power is supplied to the light source 260 via the contact pads 234. Control signals may be transmitted to the light source 260 via the contact pads 234.

In an exemplary embodiment, the pluggable optical generator module 200 includes one or more supply optical connectors 270. The supply optical connectors 270 are communicatively coupled to the light source 260. The supply optical connectors 270 receive light from the light source 260. The supply optical connectors 270 are configured to transmit the light to the optical receptacle connector 300. The supply optical connectors 270 may be coupled to the circuit board 230. Alternatively, the supply optical connectors 270 may be coupled to the plug housing 210. Optionally, the supply optical connectors 270 may be movable relative to the plug housing 210. For example, a biasing member, such as a spring, may be coupled between the supply optical connectors 270 and the plug housing 210. The biasing member allows the supply optical connectors 270 to move (for example, float) relative to the housing. The biasing member may allow floating movement along a mating axis. Each supply optical connector 270 includes a ferrule 272 holding one or more optical fibers 274. The supply optical connector 270 includes alignment features 276, such as pins, configured to interface with the mating optical connector of the optical receptacle connector 300.

Figure 3:
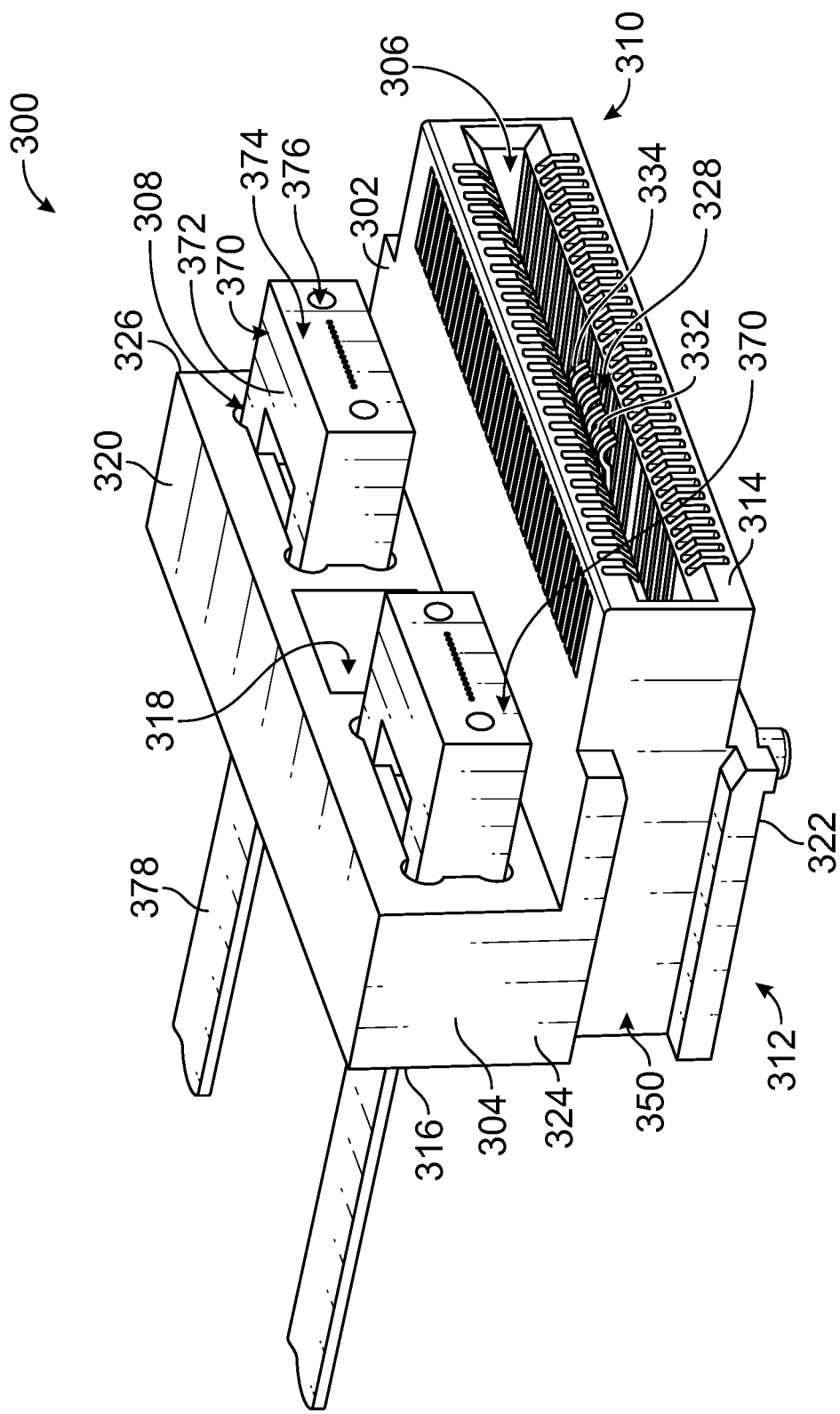
FIG. 3 is a front perspective view of the optical receptacle connector in accordance with an exemplary embodiment.
Figure 4:
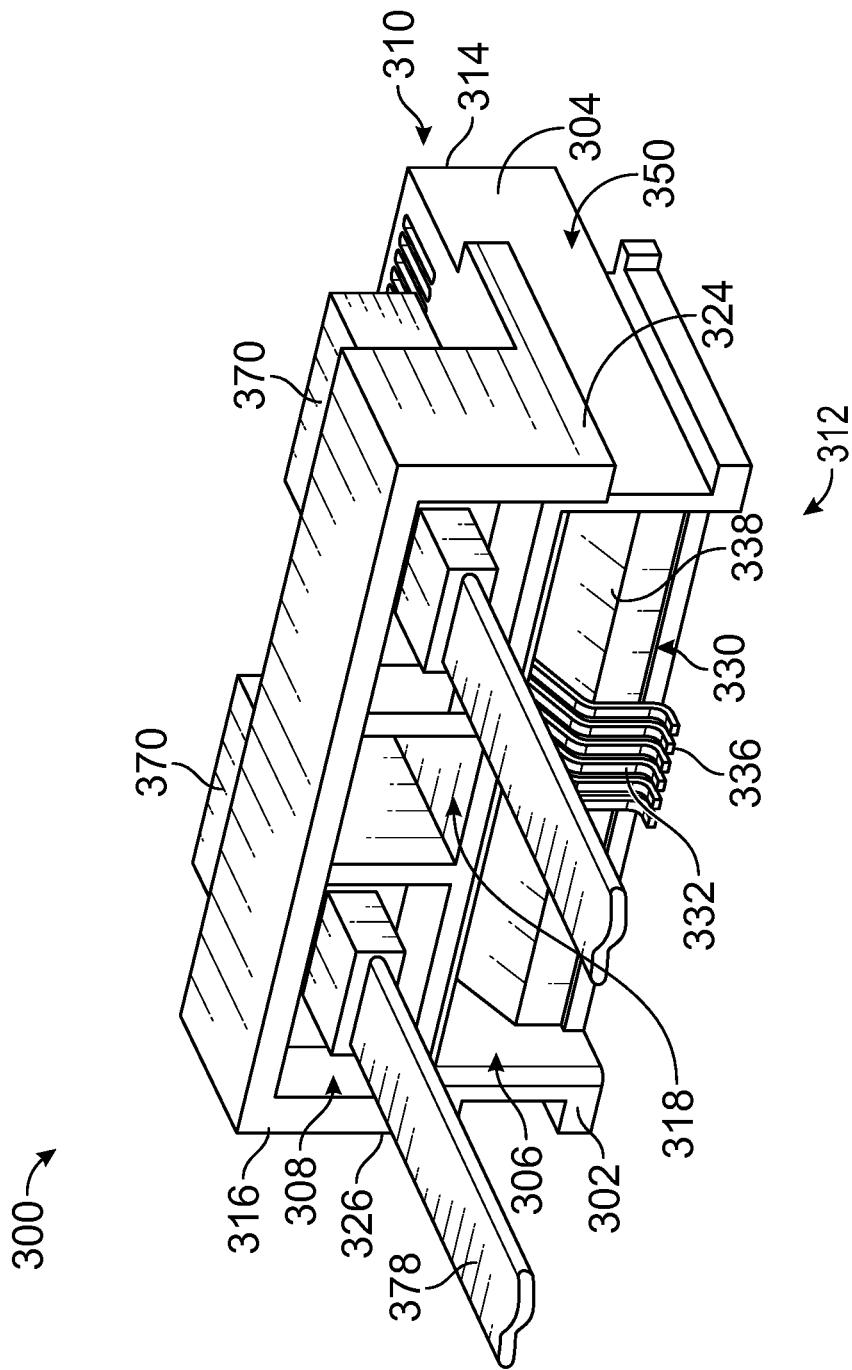
FIG. 4 is a rear perspective view of the optical receptacle connector in accordance with an exemplary embodiment.

FIG. 3 is a front perspective view of the optical receptacle connector 300 in accordance with an exemplary embodiment. FIG. 4 is a rear perspective view of the optical receptacle connector 300 in accordance with an exemplary embodiment. The optical receptacle connector 300 includes a receptacle housing 302 having housing walls 304 forming at least one contact cavity 306 and at least one optical cavity 308.

The receptacle housing 302 includes a mating end 310 and a mounting end 312. The mounting end 312 is configured to be mounted to the circuit board 106 (shown in FIG. 1). The mating end 310 is used for mating with the pluggable optical generator module 200 (shown in FIG. 2). The mating end 310 may be perpendicular to the mounting end 312. For example, the mating end 310 may be at a front of the receptacle housing 302 and the mounting end 312 may be at a bottom of the receptacle housing 302. Other orientations are possible in alternative embodiments.

The receptacle housing 302 extends between a front 314 and a rear 316. In an exemplary embodiment, the receptacle housing 302 includes one or more airflow channels 318 through the receptacle housing 302. The airflow channels 318 extend between the front 314 and the rear 316. The airflow channels 318 allow cooling airflow to pass through the receptacle housing 302, such as for cooling components of the optical receptacle connector 300 and/or for cooling the pluggable optical generator module 200.

The receptacle housing 302 includes a top wall 320, a bottom wall 322, a first side wall 324 extending between the top wall 320 and the bottom wall 322, and a second side wall 326 extending between the top wall 320 and the bottom wall 322. In various embodiments, the top wall 320 and/or the bottom wall 322 and/or the side walls 324, 326 may be stepped walls (for example, non-planar). In the illustrated embodiment, the contact cavity 306 is located near the bottom of the receptacle housing 302 and the optical cavity 308 is located near the top of the receptacle housing 302. Other orientations are possible in alternative embodiments. In an exemplary embodiment, the receptacle housing 302 includes a card slot 328 at the front 314. The card slot 328 is configured to receive the mating edge 232 of the optical module circuit board 230 to electrically connect the pluggable optical generator module 200 with the optical receptacle connector 300.

In an exemplary embodiment, the optical receptacle connector 300 includes a contact assembly 330 coupled to the receptacle housing 302. The contact assembly 330 is received in the contact cavity 306. The contact assembly 330 includes a plurality of receptacle contacts 332. In an exemplary embodiment, the contacts 332 extend into the card slot 328 for mating with the optical module circuit board 230. Each contact includes a mating end 334 (FIG. 3) and a terminating end 336 (FIG. 4) opposite the mating end 334. The mating end 334 is configured to be mated with the optical module circuit board 230. For example, the mating end 334 extends to the mating end 310, such as into the card slot 328. The terminating end 336 is configured to be terminated to the circuit board 106. For example, the terminating end 336 extends to the mounting end 312, such as at the bottom. One or more of the receptacle contacts 332 may be power contacts configured to transmit or supply power, such as from the circuit board 106 to the optical module circuit board 230. The power supplied to the optical module circuit board 230 is used to power the light source 260 (shown in FIG. 2). One or more of the receptacle contacts 332 may be signal contacts configured to transmit data signal between the circuit board 106 and the optical module circuit board 230.

In an exemplary embodiment, the receptacle contacts 332 are stamped and formed contacts. The receptacle contacts 332 include spring beams at the mating end 334 and tails, such as solder tails, at the terminating end 336. In an exemplary embodiment, the contact assembly 330 includes a contact holder 338 (FIG. 4) holding the receptacle contacts 332. The contact holder 338 is manufactured from a dielectric material, such as plastic material. The contact holder 338 may hold relative positions of the receptacle contacts 332, such as spacing between the receptacle contacts 332. The contact holder 338 may position the spring beams relative to each other and the solder tails relative to each other. The contact holder 338 may be overmolded around the receptacle contacts 332 in various embodiments. Alternatively, the contact holder 338 may be pre-molded and the receptacle contacts 332 loaded or stitched into the contact holder 338. The contact holder 338 is loaded into the contact cavity 306 to position the receptacle contacts 332 in the receptacle housing 302. In alternative embodiments, the receptacle contacts 332 may be loaded directly into the receptacle housing 302 without the use of the contact holder 338.

In an exemplary embodiment, the optical receptacle connector 300 includes a guide feature 350. The guide feature 350 is used to guide mating with the pluggable optical generator module 200. For example, the guide feature 350 interfaces with the guide feature 250 (shown in FIG. 2) of the pluggable optical generator module 200 to position the pluggable optical generator module 200 relative to the optical receptacle connector 300. In the illustrated embodiment, the guide feature 350 is a groove or slot extending along the side walls 324, 326. The groove may include lead-in surfaces to guide loading of the guide features 250 (for example, rails) into the grooves. Other types of guide features may be used in alternative embodiments, such as a pin, a tab, a rail, and the like. The guide feature 350 may be used to vertically position and/or horizontally position the pluggable optical generator module 200 relative to the optical receptacle connector 300. The guide feature 350 may be used to prevent rotation of the pluggable optical generator module 200 relative to the optical receptacle connector 300.

In an exemplary embodiment, the optical receptacle connector 300 includes one or more receive optical connectors 370. The receive optical connector 370 is received in the corresponding optical cavity 308. The receive optical connector 370 may be coupled to the housing walls 304 to position the receive optical connector 370 relative to the receptacle housing 302 and/or relative to the contact assembly 330 for mating with the pluggable optical generator module 200. Optionally, the receive optical connector 370 may be movable relative to the receptacle housing 302. For example, a biasing member, such as a spring, may be coupled between the receive optical connector 370 and the receptacle housing 302. The biasing member allows the receive optical connector 370 to move (for example, float) relative to the receptacle housing 302. The biasing member may allow floating movement along a mating axis. The receive optical connectors 370 are configured to be communicatively coupled with the supply optical connectors 270 (shown in FIG. 2). The receive optical connectors 370 receive optical signals from the supply optical connectors 270.

In the illustrated embodiment, the optical receptacle connector 300 includes two receive optical connectors 370 received in the receptacle housing 302. The receive optical connectors 370 may be received in different optical cavities 308. Alternatively, the receive optical connectors 370 may be received in a common optical cavity 308. Optionally, the optical receptacle connector 300 may include an optical connector support housing (not shown) that holds the receive optical connectors 370 relative to each other, which is loaded into the optical cavity 308 and coupled to the receptacle housing 302 to position the receive optical connectors 370 relative to the receptacle housing 302.

Each receive optical connector 370 includes a ferrule 372 holding one or more optical fibers 374. The receive optical connector 370 includes alignment features 376, such as openings, configured to interface with the alignment features 276 (shown in FIG. 2) of the pluggable optical generator module 200 to align the supply optical connector 270 with the receive optical connector 370. The receive optical connector 370 includes an optical cable 378 extending from the ferrule 372. The optical fibers 374 extend along the optical cable 378.

Returning to FIG. 1, the optical receptacle connector 300 is located in the receptacle cage 120, such as at the rear end of the receptacle cage 120. The receptacle contacts 332 of the optical receptacle connector 300 are electrically connected to the circuit board 106. The optical cables 378 extend rearward from the optical receptacle connector 300 and may be routed to another component remote from the receptacle module 102. During use, the pluggable optical generator module 200 is pluggable into the receptacle cage 120 to mate with the optical receptacle connector 300 at a separable mating interface. When mated, electrical power is supplied from the optical receptacle connector 300, through the receptacle contacts 332, to the pluggable optical generator module 200. The power is used to operate the light source 260 of the pluggable optical generator module 200, which generates optical signals. The optical signals are transmitted to the receive optical connectors 370 and the optical signals are transmitted form the receive optical connectors 370 through optical cables 378.

Figure 5:
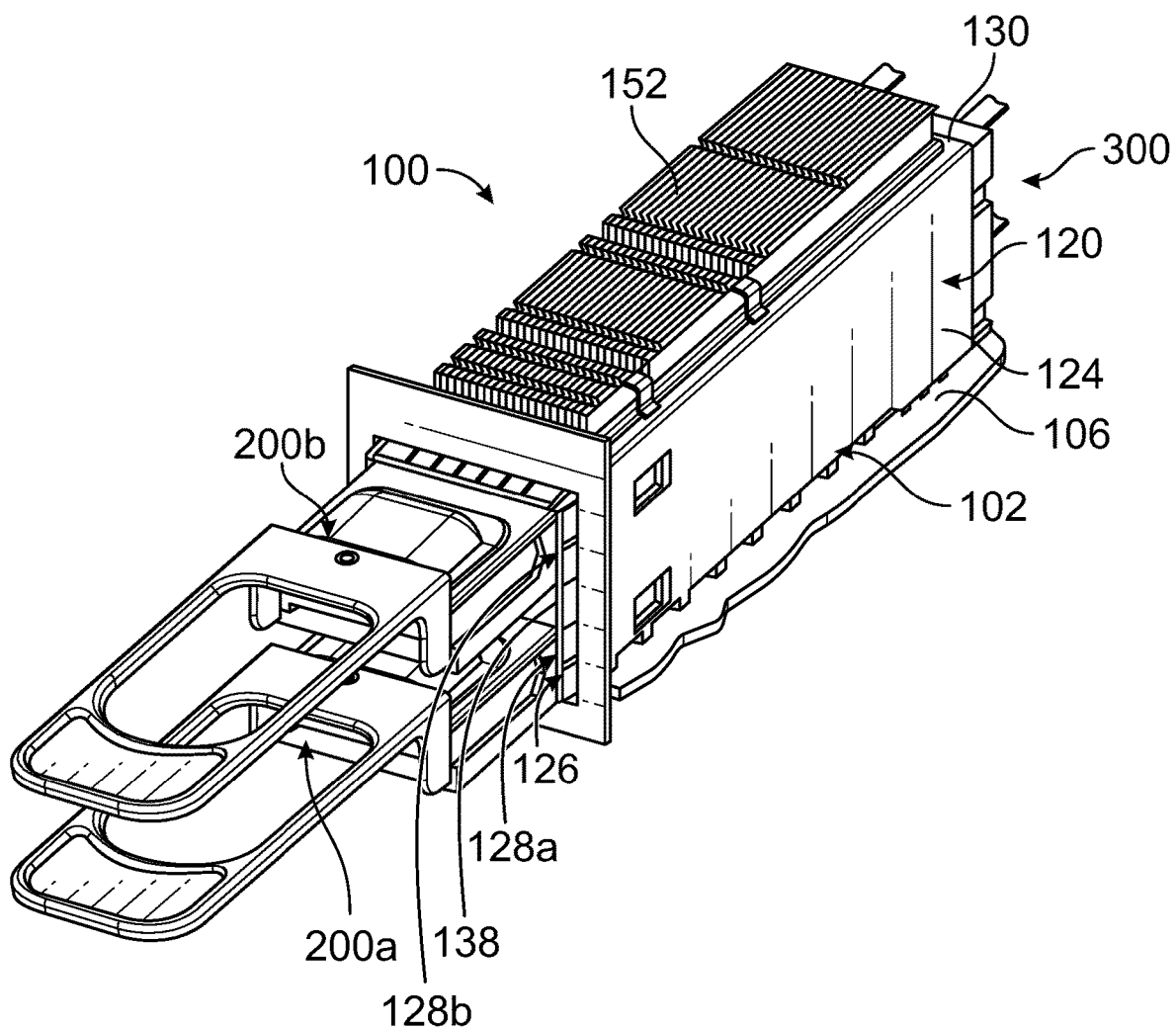
FIG. 5 is a perspective view of the optical communication system in accordance with an exemplary embodiment.
Figure 6:
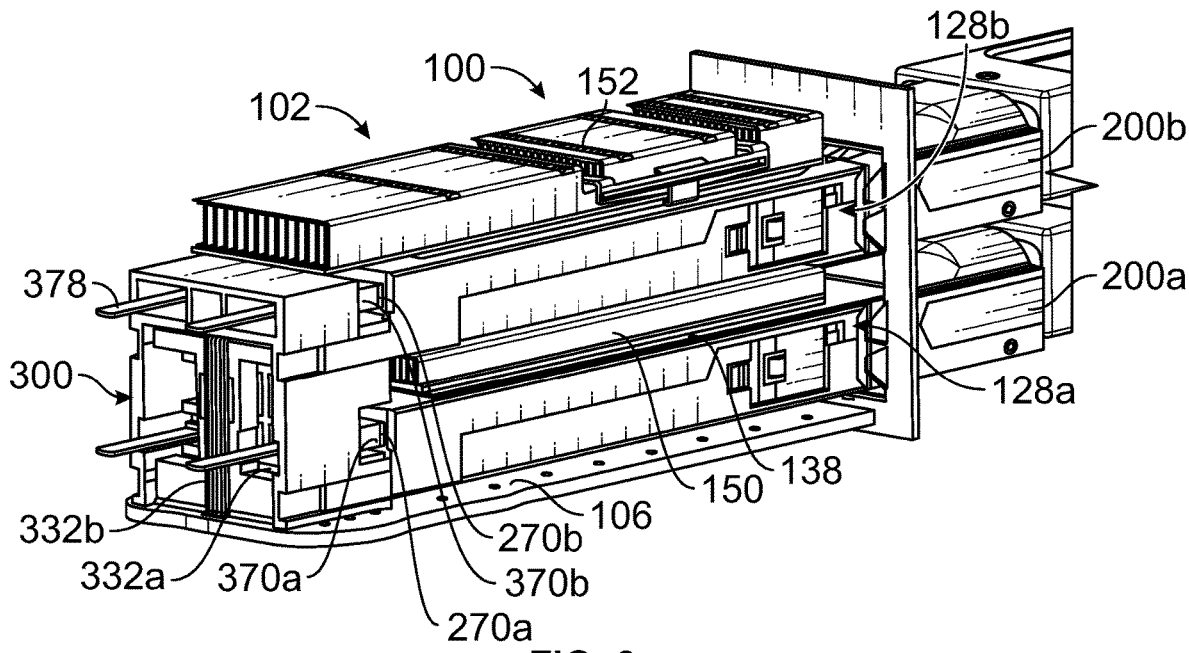
FIG. 6 is a partial sectional, perspective view of the optical communication system in accordance with an exemplary embodiment.

FIG. 5 is a perspective view of the optical communication system 100 in accordance with an exemplary embodiment. FIG. 6 is a perspective view of a portion of the optical communication system 100 in accordance with an exemplary embodiment with the receptacle cage 120 removed to illustrate the internal components. The optical communication system 100 shown in FIGS. 5 and 6 is a stacked optical communication system 100 having a stacked optical receptacle connector 300 for mating with multiple pluggable optical generator modules 200. The optical receptacle connector 300 receives optical signals from the pluggable optical generator modules 200. In an exemplary embodiment, the optical receptacle connector 300 supply power to the pluggable optical generator modules 200.

The receptacle cage 120 of the receptacle module 102 is mounted to the circuit board 106. The pluggable optical generator modules 200 are pluggable into the receptacle cage 120 to mate with the optical receptacle connector 300 at separable mating interfaces. The cage walls 124 of the receptacle cage 120 define the cavity 126, which, in the illustrated embodiment, is divided into a lower module channel 128a and an upper module channel 128b by a divider wall 138. The upper module channel 128b is stacked above the lower module channel 128a. The divider wall 138 may form a gap or chamber configured to receive a heat sink 150 used to dissipate heat from the lower pluggable optical generator modules 200a in the lower module channel 128a. The optical receptacle connector 300 has airflow channels to allow cooling airflow through the receptacle cage 120, such as for cooling the heat sink 150. In an exemplary embodiment, a heat sink 152 is coupled to the top wall 130 to dissipate heat from the upper pluggable optical generator modules 200b in the upper module channel 128b.

Figure 7:
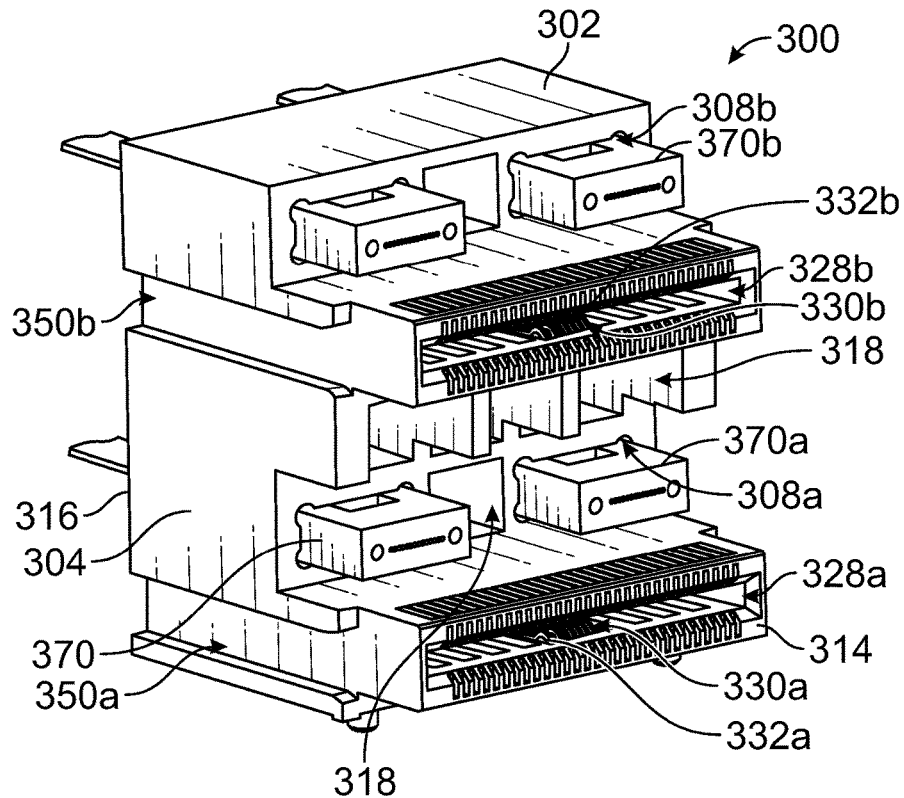
FIG. 7 is a front perspective view of the optical receptacle connector in accordance with an exemplary embodiment.
Figure 8:
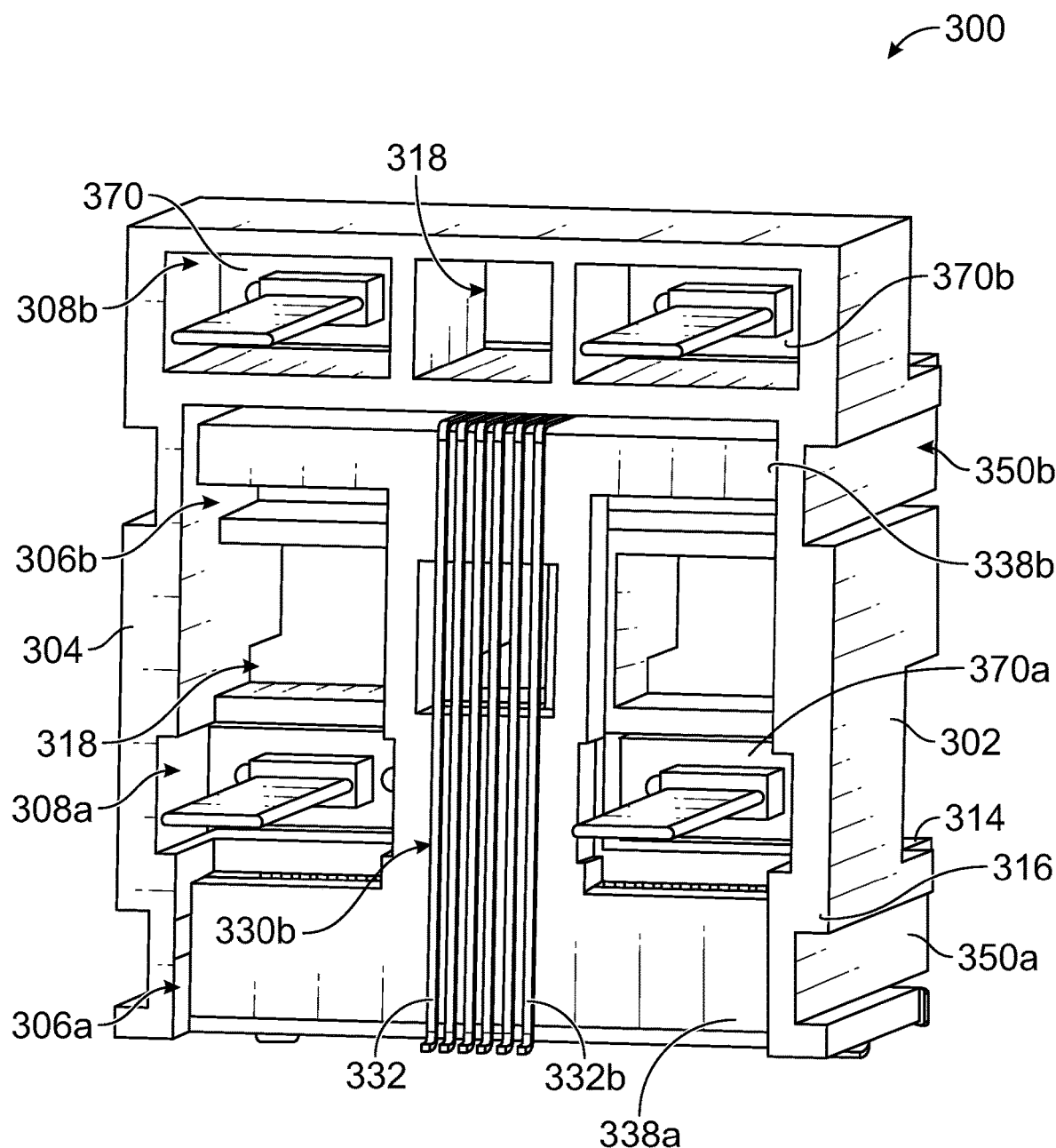
FIG. 8 is a rear perspective view of the optical receptacle connector in accordance with an exemplary embodiment.

FIG. 7 is a front perspective view of the optical receptacle connector 300 in accordance with an exemplary embodiment. FIG. 8 is a rear perspective view of the optical receptacle connector 300 in accordance with an exemplary embodiment. The receptacle housing 302 has housing walls 304 forming multiple contact cavities 306 and multiple optical cavities 308. For example, the receptacle housing 302 includes a lower contact cavity 306a and an upper contact cavity 306b. The receptacle housing 302 includes a lower optical cavity 308a and an upper optical cavity 308b. The receptacle housing 302 includes a lower card slot 328a at the front 314 and an upper card slot 328b configured to receive the mating edges 232 of the optical module circuit boards 230 of the pluggable optical generator modules 200.

The receptacle housing 302 includes airflow channels 318 through the receptacle housing 302 between the front 314 and the rear 316. The airflow channels 318 allow cooling airflow to pass through the receptacle housing 302, such as for cooling components of the optical receptacle connector 300 and/or for cooling the pluggable optical generator module 200. In the illustrated embodiment, the airflow channels 318 are located between the lower card slot 328a and the upper card slot 328b to allow cooling airflow through the central region of the receptacle housing 302. The receptacle housing 302 may include airflow channels 318 between the receive optical connectors 370. The contact holders 338 may be shaped so as to not block the airflow through the receptacle housing 302.

In an exemplary embodiment, the optical receptacle connector 300 includes a lower contact assembly 330a received in the lower contact cavity 306a. The receptacle contacts 332a (shown in FIG. 7) of the lower contact assembly 330a extend into the lower card slot 328a. A lower contact holder 338a holds relative positions of the lower receptacle contacts 332a, such as spacing between the receptacle contacts 332a. In an exemplary embodiment, the optical receptacle connector 300 includes an upper contact assembly 330b received in the upper contact cavity 306b. The receptacle contacts 332b of the upper contact assembly 330b extend into the upper card slot 328b. An upper contact holder 338b holds relative positions of the upper receptacle contacts 332b, such as spacing between the receptacle contacts 332b. In the illustrated embodiment, the receptacle contacts 332a, 332b are approximately centered within the receptacle housing 302. However, the receptacle contacts 332, 332b may additionally or alternatively be provided at the sides of the receptacle housing 302 rather than being centered.

In an exemplary embodiment, the optical receptacle connector 300 includes lower and upper guide features 350a, 350b. The guide feature 350a, 350b are used to guide mating with the lower and upper pluggable optical generator module 200. The lower guide features 350a may be aligned with the lower card slot 328a. The upper guide features 350b may be aligned with the upper card slot 328b.

In an exemplary embodiment, the optical receptacle connector 300 includes lower receive optical connectors 370a and upper receive optical connectors 370b. The lower receive optical connectors 370a are received in the corresponding lower optical cavities 308a. The lower receive optical connectors 370a are configured to be communicatively coupled with the supply optical connectors 270 of the lower pluggable optical generator modules 200. The upper receive optical connectors 370b are received in the corresponding upper optical cavities 308b. The upper receive optical connectors 370b are configured to be communicatively coupled with the supply optical connectors 270 of the upper pluggable optical generator modules 200. The receive optical connectors 370 receive optical signals from the supply optical connectors 270.

Returning to FIG. 6, the optical receptacle connector 300 is located in the receptacle cage 120, such as at the rear end of the receptacle cage 120. The lower and upper receptacle contacts 332a, 332b of the optical receptacle connector 300 are electrically connected to the circuit board 106. The optical cables 378 of the lower and upper supply optical connectors 270a, 270b extend rearward from the optical receptacle connector 300 and may be routed to another component remote from the receptacle module 102. During use, the lower pluggable optical generator module 200a is plugged into the lower module channel 128a to mate with the optical receptacle connector 300 at a separable mating interface. The optical module circuit board 230 of the lower pluggable optical generator modules 200a is plugged into the lower card slot 328a. The lower supply optical connectors 270a are mated with the lower receive optical connectors 370a. Similarly, the upper pluggable optical generator module 200b is plugged into the upper module channel 128b to mate with the optical receptacle connector 300 at a separable mating interface. The optical module circuit board 230 of the upper pluggable optical generator modules 200b is plugged into the upper card slot 328b. The upper supply optical connectors 270b are mated with the upper receive optical connectors 370b.

When mated, electrical power is supplied from the circuit board 106, through the lower and upper receptacle contacts 332a, 332b, to the lower and upper pluggable optical generator modules 200a, 200b. The power is used to operate the light sources of the pluggable optical generator modules 200a, 200b to generate optical signals. The optical signals are transmitted to the lower and upper receive optical connectors 370a, 370b and the optical signals are transmitted form the receive optical connectors 370a, 370b through the optical cables 378.

Figure 9:
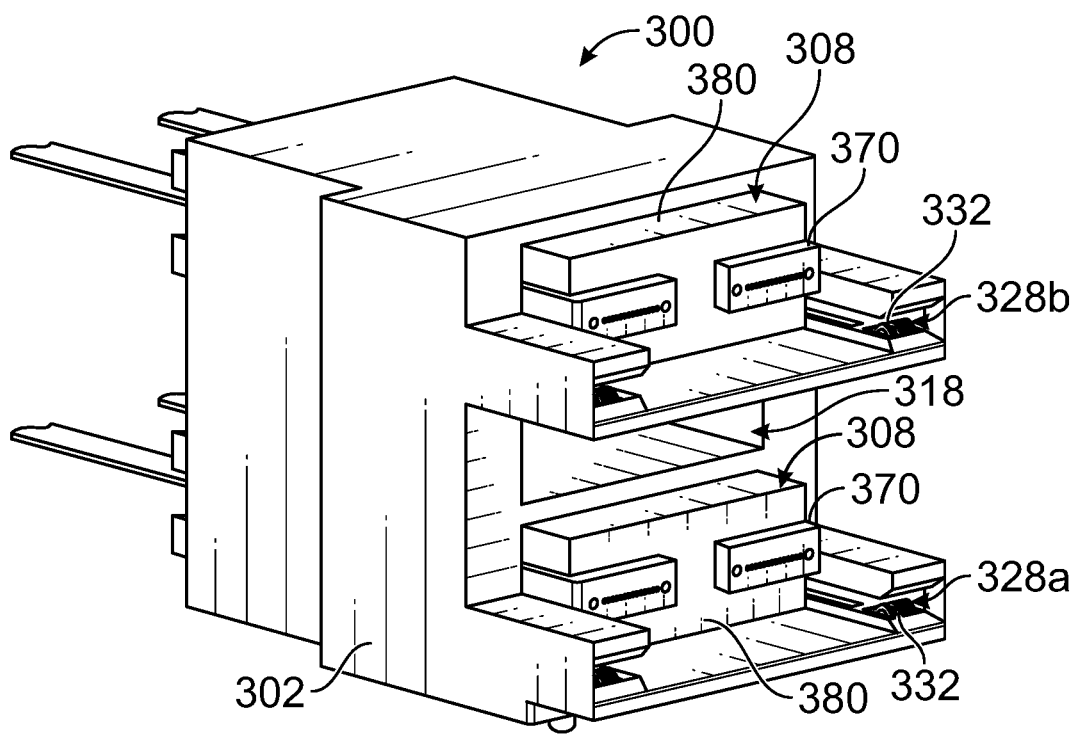
FIG. 9 is a front perspective view of the optical receptacle connector in accordance with an exemplary embodiment.
Figure 10:
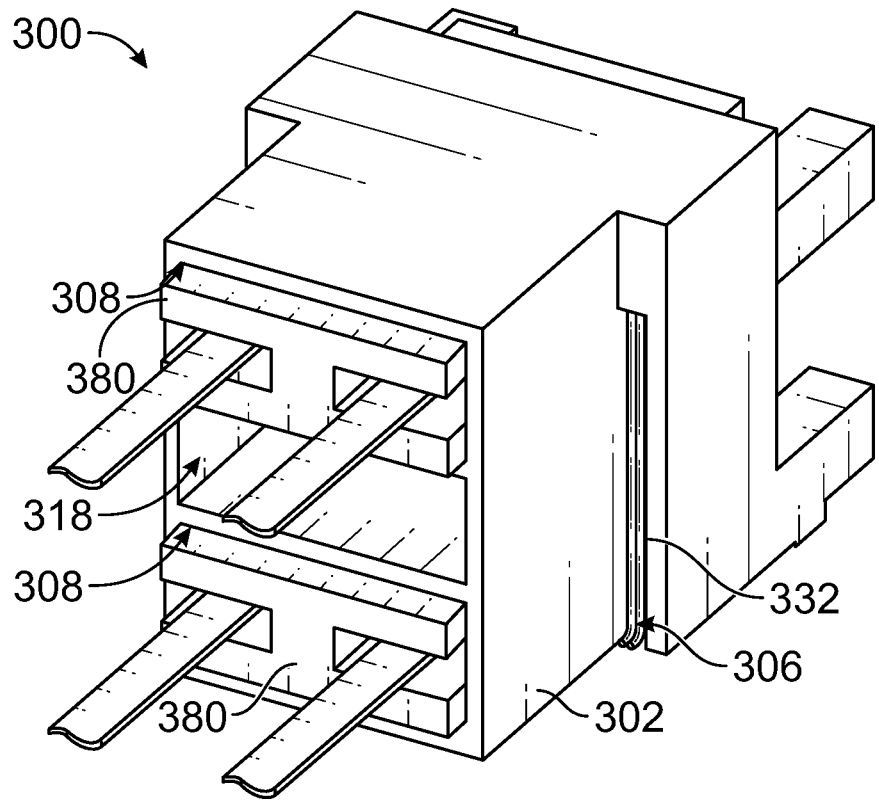
FIG. 10 is a rear perspective view of the optical receptacle connector in accordance with an exemplary embodiment.

FIG. 9 is a front perspective view of the optical receptacle connector 300 in accordance with an exemplary embodiment. FIG. 10 is a rear perspective view of the optical receptacle connector 300 in accordance with an exemplary embodiment. In the illustrated embodiment, the receptacle housing 302 is a stacked receptacle housing having lower and upper contact cavities 306 and lower and upper optical cavities 308. The receptacle housing 302 includes an airflow channel 318 between the optical cavities 308. In the illustrated embodiment, the receptacle contacts 332 are split into groups at the right side and the left side of the card slots 328a, 328b. The receive optical connectors 370 are located between the groups of receptacle contacts 332.

In an exemplary embodiment, the optical receptacle connector 300 includes an optical connector support housing 380 received in the optical cavities 308. The optical connector support housing 380 holds the receive optical connectors 370. For example, the receive optical connectors 370 may be preloaded into the optical connector support housing 380 and then the assembly is loaded into the optical cavity 308. The optical connector support housing 380 is coupled to the receptacle housing 302. The optical connector support housing 380 holds the receive optical connectors 370 relative to the receptacle housing 302.

Figure 11:
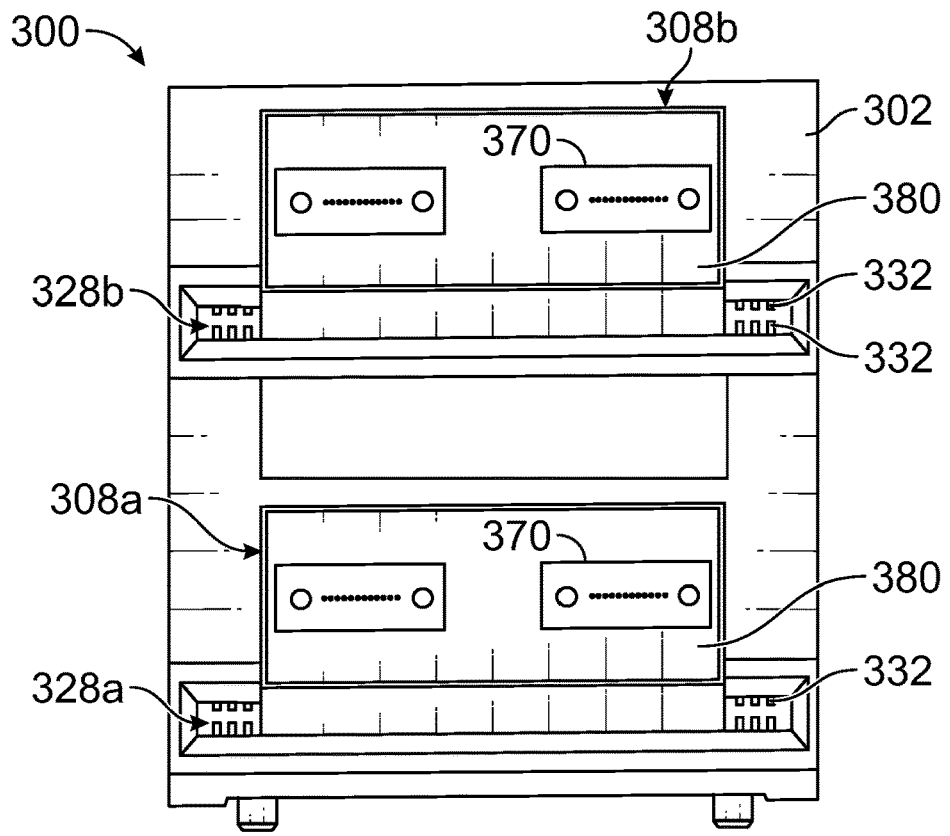
FIG. 11 is a front view of the optical receptacle connector in accordance with an exemplary embodiment.

FIG. 11 is a front view of the optical receptacle connector 300 in accordance with an exemplary embodiment. In the illustrated embodiment, the receptacle contacts 332 are split into groups at the right side and the left side of the card slots 328a, 328b. The optical connector support housings 380 are received in the optical cavities 308a, 308b above the card slots 328a, 328b. The optical connector support housings 380 hold the receive optical connectors 370.

Figure 12:
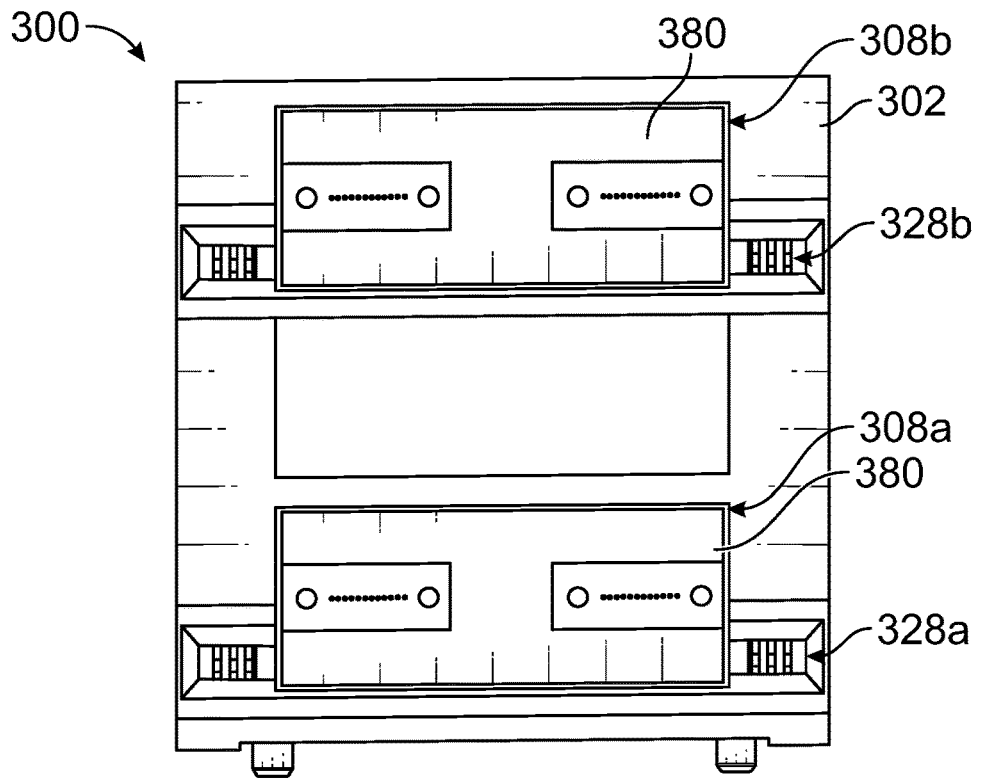
FIG. 12 is a front view of the optical receptacle connector in accordance with an exemplary embodiment.

FIG. 12 is a front view of the optical receptacle connector 300 in accordance with an exemplary embodiment. In the illustrated embodiment, the optical connector support housings 380 are received in the optical cavities 308a, 308b. The optical connector support housings 380 extend into the card slots 328a, 328b. By locating the optical connector support housings 380 in the card slots 328a, 328b, the overall height of the receptacle housing 302 may be shorter compared to the embodiment illustrated in FIG. 9.

Figure 13:
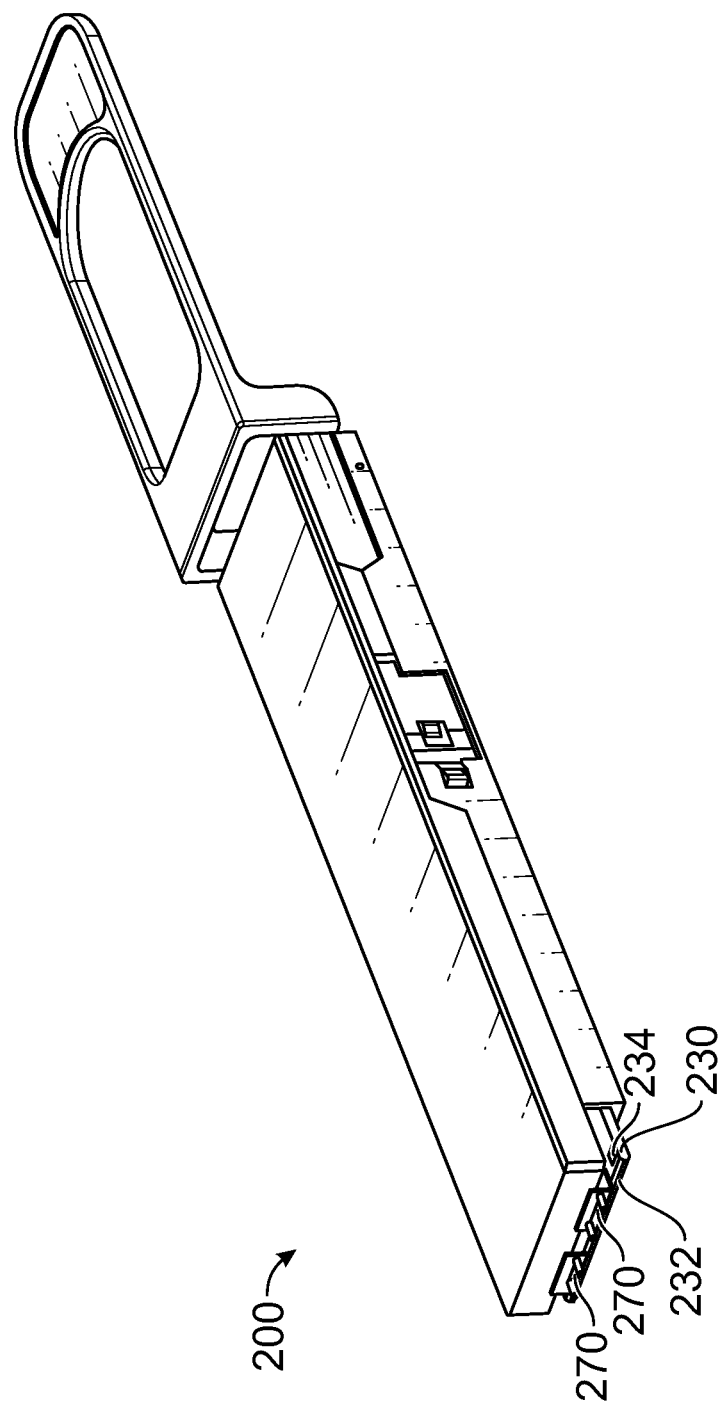
FIG. 13 is a front perspective view of a pluggable optical generator module in accordance with an exemplary embodiment.

FIG. 13 is a front perspective view of the pluggable optical generator module 200 in accordance with an exemplary embodiment. The pluggable optical generator module 200 includes the supply optical connectors 270 above the optical module circuit board 230. The supply optical connectors 270 may be mounted to or resting on the optical module circuit board 230. In the illustrated embodiment, the optical module circuit board 230 includes the contact pads 234 at the outer sides of the mating edge 232 flanking the supply optical connectors 270. Other configurations or possible in alternative embodiments for the supply optical connectors 270 and the contact pads 234.

Figure 14:
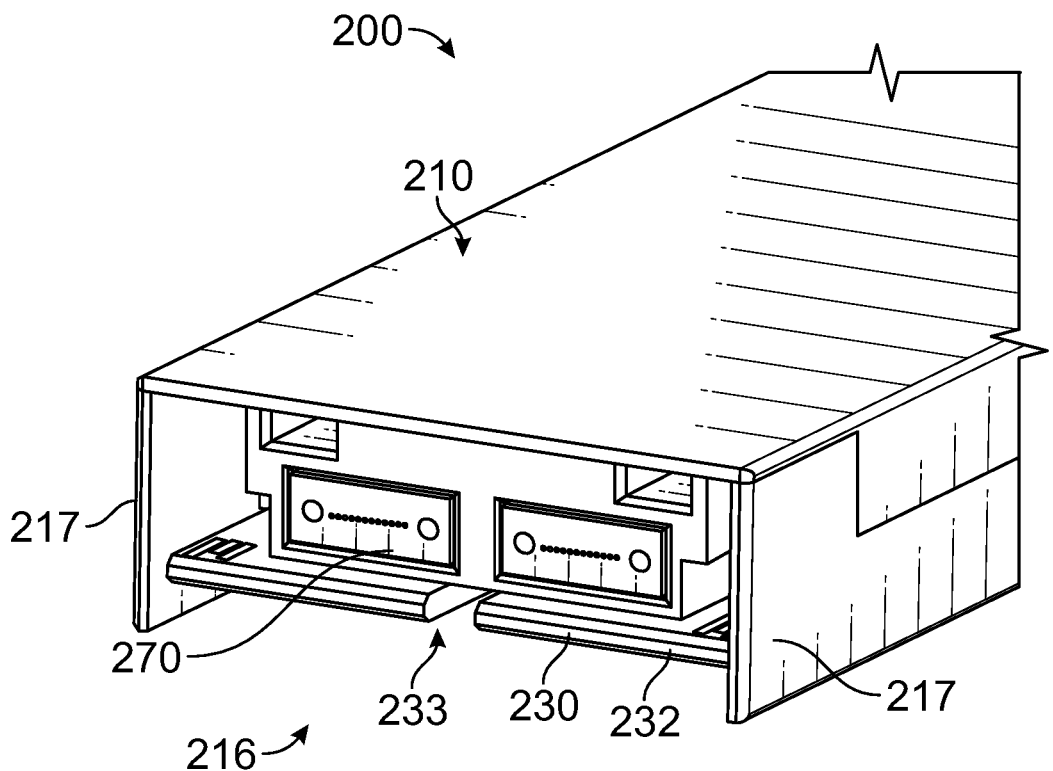
FIG. 14 is a front perspective view of a pluggable optical generator module in accordance with an exemplary embodiment.

FIG. 14 is a front perspective view of a pluggable optical generator module 200 in accordance with an exemplary embodiment. The pluggable optical generator module 200 includes the supply optical connectors 270 above the optical module circuit board 230. In the illustrated embodiment, the plug housing 210 includes a shroud 217 at the mating end 216 covering the optical module circuit board 230 on the top and both sides. The shroud 217 may additionally cover the optical module circuit board 230 at the bottom. In an exemplary embodiment, the optical module circuit board 230 includes a slot 233 at the mating edge 232. The slot 233 forms a guide feature for the optical module circuit board 230. The slot 233 may be used to guide mating with the optical receptacle connector 300 (shown in FIG. 15).

Figure 15:
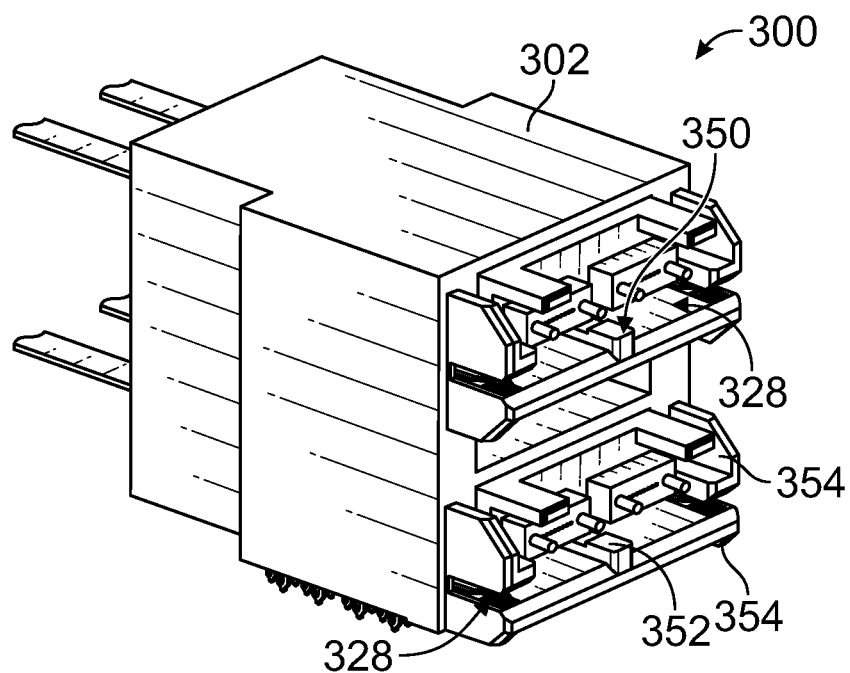
FIG. 15 is a front perspective view of the optical receptacle connector in accordance with an exemplary embodiment.

FIG. 15 is a front perspective view of the optical receptacle connector 300 in accordance with an exemplary embodiment. The receptacle housing 302 is shaped to interface with the shrouded pluggable optical generator module 200 (shown in FIG. 14). The sides of the receptacle housing 302 are inset to accommodate the shroud 217 (shown in FIG. 14). The receptacle housing 302 includes a rib 352 forming the guide feature 350 of the receptacle housing 302. The rib 352 is used to guide mating with the pluggable optical generator module 200. The rib 352 is configured to be received in the slot 233 (shown in FIG. 14). The rib 352 extends into the card slot 328. Optionally, the rib 352 may be centered in the card slot 328. Alternatively, the rib 352 may be offset to form a keying feature. In an exemplary embodiment, the receptacle housing 302 includes gussets 354 used to support the walls forming the card slot 328. The gussets 354 are provided at the sides of the receptacle housing 302 in the illustrated embodiment.

Figure 16:
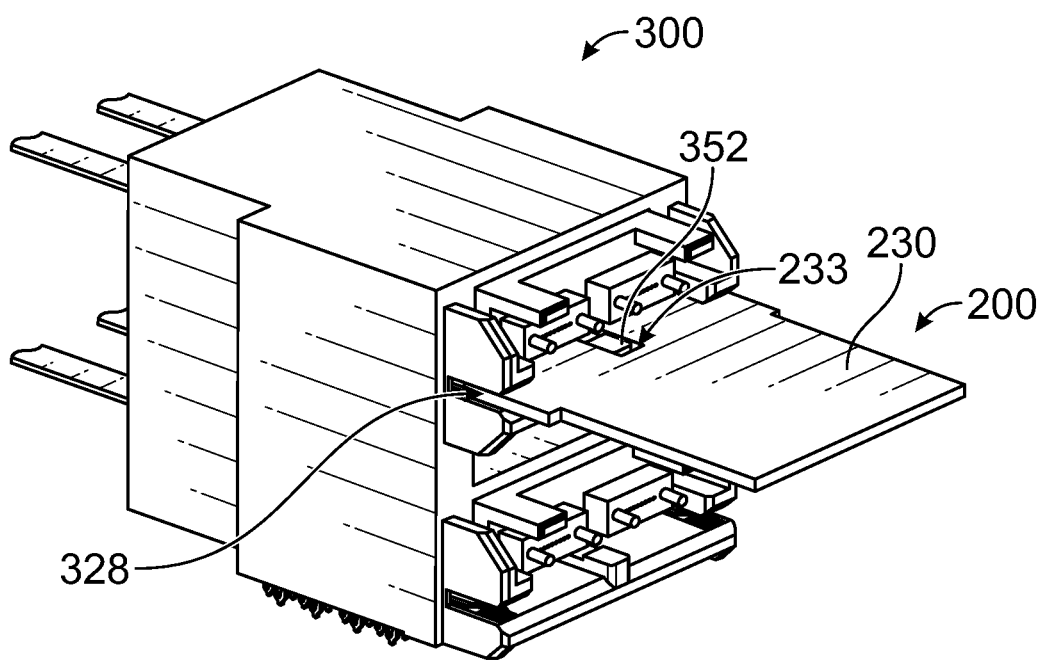
FIG. 16 is a front perspective view of the optical receptacle connector in accordance with an exemplary embodiment showing a portion of the pluggable optical generator module coupled to the optical receptacle connector.

FIG. 16 is a front perspective view of the optical receptacle connector 300 in accordance with an exemplary embodiment showing a portion of the pluggable optical generator module 200 coupled to the optical receptacle connector 300. FIG. 16 shows the optical module circuit board 230 coupled to the optical receptacle connector 300. The rib 352 is received in the slot 233 to position the optical module circuit board 230 within the card slot 328. Optionally, sides of the card slot 328 may be open to allow the optical module circuit board 230 to extend to the exterior of the receptacle housing 302.

Figure 17:
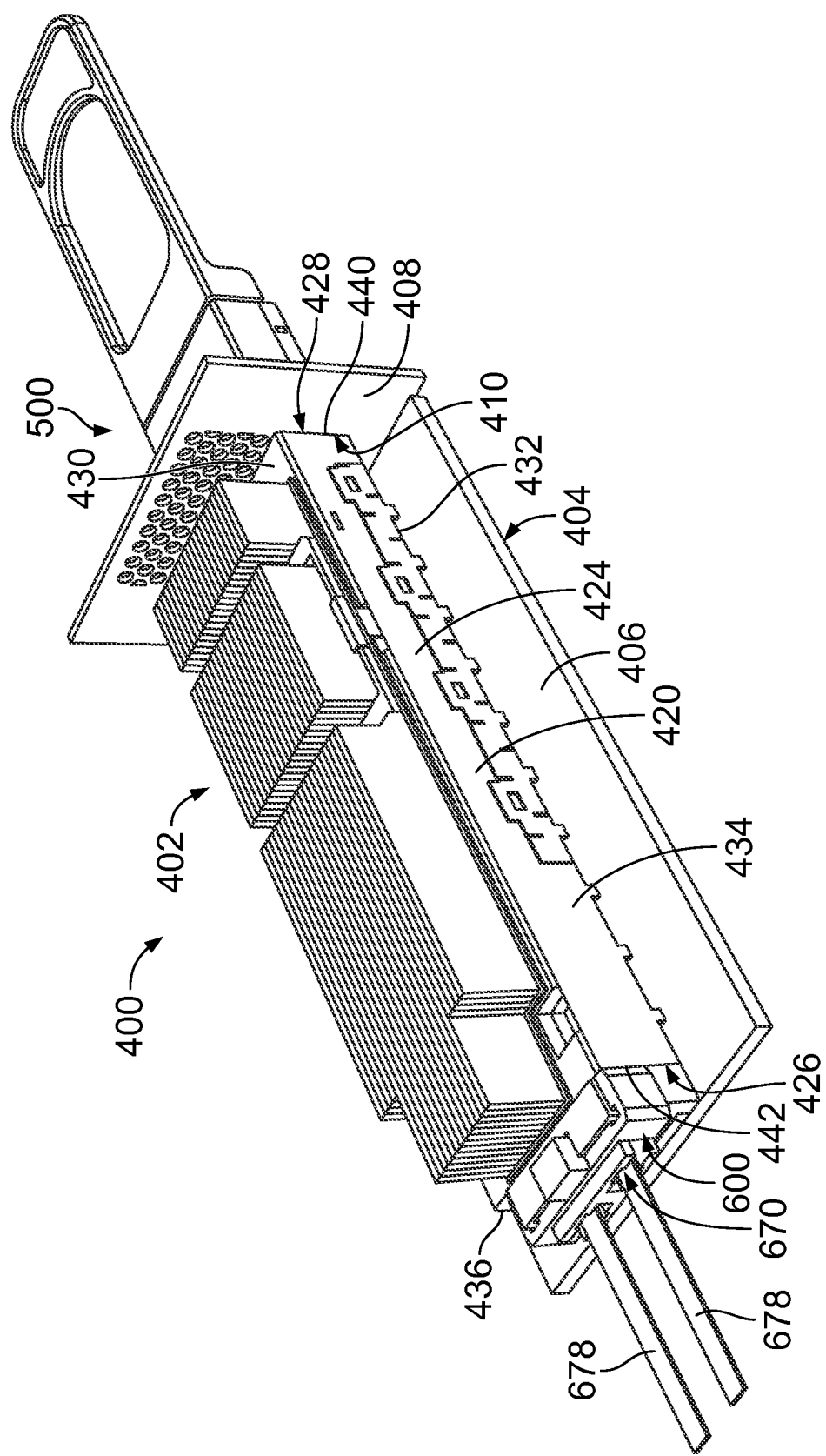
FIG. 17 is a perspective view of an optical communication system formed in accordance with an exemplary embodiment.

FIG. 17 is a perspective view of an optical communication system 400 formed in accordance with an exemplary embodiment. The optical communication system 400 may be similar to the optical communication system 100 shown in FIG. 1; however, the optical communication system 400 may include a different optical receptacle connector. Optionally, the optical communication system 400 may be identical to the optical communication system 100 other than the different optical receptacle connector.

The optical communication system 400 includes a receptacle module 402 and one or more pluggable optical generator modules 500 configured to be electrically connected to the receptacle module 402. The pluggable optical generator module 500 may be similar to the pluggable optical generator module 200 shown in FIG. 2. The pluggable optical generator module 500 (may be referred to hereinafter as pluggable module 500) is used to generate optical signals. For example, the pluggable optical generator module 500 may include a light source, such as a laser generator, for generating the optical signals, which are transmitted from the pluggable optical generator module 500 to the receptacle module 402. The receptacle module 402 receives the optical signals from the pluggable optical generator module 500. In an exemplary embodiment, the receptacle module 402 supplies power to the pluggable optical generator module 500, which is used to operate the light source.

The receptacle module 402 includes a receptacle cage 420 and one or more optical receptacle connectors 600 received in the receptacle cage 420. The optical receptacle connector 600 may be similar to the optical receptacle connector 300 shown in FIGS. 3 and 4. The optical receptacle connector 600 is configured to be coupled to the pluggable optical generator module 500. The pluggable optical generator module 500 is pluggable into the receptacle cage 420 to mate with the optical receptacle connector 600 at a separable mating interface. When mated, electrical power is supplied from the optical receptacle connector 600 to the pluggable optical generator module 500. When mated, optical signals, generated by the pluggable optical generator module 500, are transmitted to the optical receptacle connector 600 and may be transmitted from the optical receptacle connector 600 through optical cables. The pluggable optical generator module 500 may be unmated from the optical receptacle connector 600 and may be removed from the receptacle cage 420, such as for repair or replacement.

In an exemplary embodiment, the receptacle module 402 is mounted to a support structure 404. For example, in the illustrated embodiment, the support structure 404 may include a circuit board 406. The receptacle module 402 is mounted to the circuit board 406. The optical receptacle connector 600 is electrically connected to the circuit board 406, such as to one or more circuits. In an exemplary embodiment, the circuit board 406 supplies power to the optical receptacle connector 600. The circuit board 406 may provide a ground reference for the optical receptacle connector 600. The circuit board 406 may provide data signals to the optical receptacle connector 600.

In an exemplary embodiment, the support structure 404 may additionally, or alternatively, include a panel 408. The panel 408 may be a rack panel in a server in various embodiments. In other various embodiments, the panel 408 may include a cabinet or chassis of an electrical device, such as a computer. The panel 408 may be another type of support structure in alternative embodiments. The panel 408 may be a metal plate or sheet in various embodiments. In an exemplary embodiment, the panel 408 is oriented perpendicular to the mating direction of the modules 500, 600. The panel 408 includes a panel opening 410 therethrough. The panel opening 410 is open between a front surface and a rear surface of the panel 408. A portion of the receptacle module 402 may extend through the panel opening 410.

The receptacle module 402 includes the receptacle cage 420. The optical receptacle connector 600 is configured to be loaded into a rear of the receptacle cage 420. The pluggable optical generator module 500 is configured to be loaded into a front of the receptacle cage 420. The pluggable optical generator module 500 is mated to the optical receptacle connector 600 inside the receptacle cage 420. In various embodiments, the receptacle cage 420 is enclosed and provides electrical shielding for the optical receptacle connector 600 and the pluggable optical generator module 500.

The receptacle cage 420 includes a plurality of cage walls 424 that define a cavity 426. The cavity 426 may be subdivided by corresponding cage walls 424 to form one or more module channels 428 for receipt of corresponding pluggable optical generator modules 500 and optical receptacle connectors 600. The receptacle cage 420 includes front ports open at the front of the receptacle cage 420 to receive the pluggable optical generator modules 500 and rear ports open at the rear of the receptacle cage 420 to receive the optical receptacle connectors 600. In the illustrated embodiment, the cavity 426 includes a single module channel 428. However, additional cage walls 424 may be provided to form a cavity 426 divided into more module channels, such as two module channels 428, four module channels 428 or more. The module channels 428 may be stacked vertically (for example, an upper module channel and a lower module channel) or may be stacked side-by-side. The cage walls 424 may be walls defined by solid sheets, perforated walls to allow airflow therethrough, or walls with cutouts, such as for a heat transfer device such as a heatsink, heat spreader, cold plate, and the like to pass therethrough. In the illustrated embodiment, the cage walls 424 are stamped and formed walls defining shielding walls.

In an exemplary embodiment, the cage walls 424 of the receptacle cage 420 include a top wall 430, a bottom wall 432, a first side wall 434, and a second side wall 436 for each module channel 428, which may be outer or exterior walls. In an exemplary embodiment, the cage walls 424 include cage mounting tabs for mounting the receptacle cage 420 to the circuit board 406. For example, the cage mounting tabs may be press-fit pins configured to be press-fit into vias in the circuit board 406. The receptacle cage 420 extends between a front end 440 and a rear end 442. A front port is provided at the front end 440 providing access to the module channel 428 for the pluggable optical generator module 500. A rear port is provided at the rear end 442 providing access to the module channel 428 for the optical receptacle connector 600. The cage walls 424 may include divider walls separating the cavity 426 into multiple module channels 428 (for example, a horizontal divider or a vertical divider).

Figure 18:
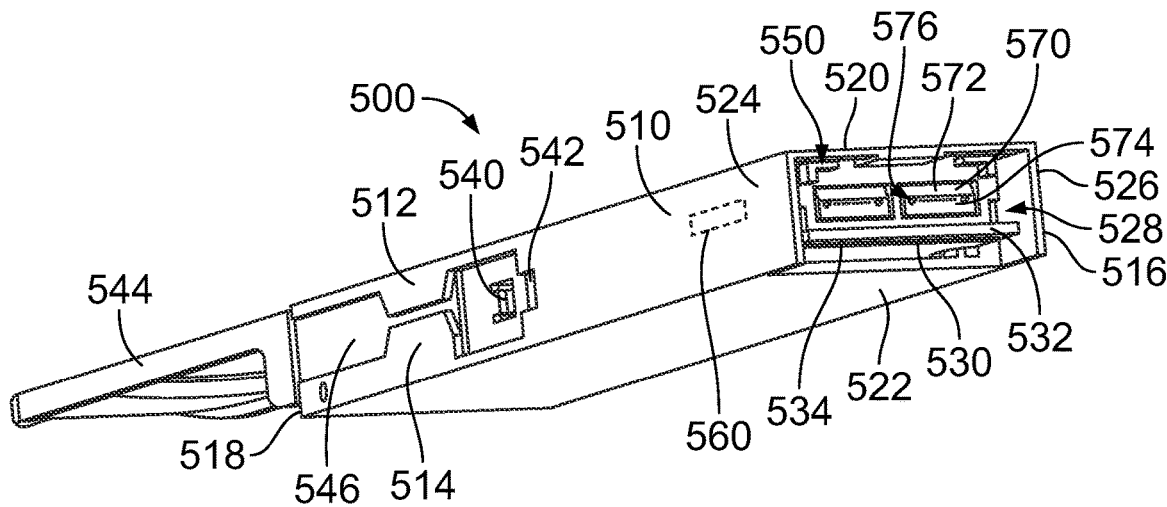
FIG. 18 is a perspective view of the pluggable optical generator module in accordance with an exemplary embodiment.

FIG. 18 is a perspective view of the pluggable optical generator module 500 in accordance with an exemplary embodiment. The pluggable optical generator module 500 includes a plug housing 510 defined by one or more shells, such as an upper shell 512 and a lower shell 514. In an exemplary embodiment, the plug housing 510 is manufactured from a conductive material, such as a metal material. The plug housing 510 provides electrical shielding for the pluggable optical generator module 500. The plug housing 510 may be thermally conductive to transfer heat from internal components to the exterior of the plug housing 510. The plug housing 510 includes a mating end 516 at a front of the pluggable optical generator module 500 and a rear end 518 opposite the mating end 516. The mating end 516 is configured to be inserted into the module channel 428 (shown in FIG. 17).

The plug housing 510 includes a top wall 520, a bottom wall 522, a first side wall 524 extending between the top wall 520 and the bottom wall 522, and a second side wall 526 extending between the top wall 520 and the bottom wall 522. The plug housing 510 surrounds a module cavity 528. The module cavity 528 houses electrical components of the pluggable optical generator module 500.

In an exemplary embodiment, the pluggable optical generator module 500 includes an optical module circuit board 530 in the module cavity 528. The circuit board 530 may be accessible at the mating end 516. The circuit board 530 is configured to be coupled to the optical receptacle connector 600 (shown in FIG. 19). For example, a mating edge 532 of the circuit board 530 may be plugged into the optical receptacle connector 600, such as in a card slot of the optical receptacle connector 600. The circuit board 530 includes electrical components used for operating and/or using the pluggable optical generator module 500. For example, the circuit board 530 may have conductors, traces, pads, electronics, sensors, controllers, switches, inputs, outputs, and the like to form various circuits. In the illustrated embodiment, the circuit board 530 includes contact pads 534 at the mating edge 532. The contact pads 534 may be provided at the upper surface and/or the lower surface. The contact pads 534 are configured to be electrically connected to the optical receptacle connector 600.

The pluggable optical generator module 500 includes a plug latch 540 for releasing the pluggable optical generator module 500 from the receptacle cage 420. The plug latch 540 includes a plug latching feature 542 (shown in phantom) configured to secure the pluggable optical generator module 500 to the receptacle cage 420. The plug latching feature 542 may be a latching finger. The plug latching feature 542 may be deflectable in various embodiments, such as to release from the receptacle cage 420. In an exemplary embodiment, the plug latch 540 includes a pull tab 544 extending from one or more latch arms 546. The pull tab 544 is configured to be pulled to release the plug latch 540 from the receptacle cage 420 and allow removal of the pluggable optical generator module 500 from the receptacle cage 420.

In an exemplary embodiment, the pluggable optical generator module 500 includes a guide feature 550. The guide feature 550 is used to guide mating with the optical receptacle connector 600. For example, the guide feature 550 interfaces with a complimentary guide feature of the optical receptacle connector 600 to position the pluggable optical generator module 500 relative to the optical receptacle connector 600. The guide feature 550 may be used to vertically position and/or horizontally position the pluggable optical generator module 500 relative to the optical receptacle connector 600. In the illustrated embodiment, the guide feature 550 is a rail extending forward from the front of the pluggable optical generator module 500. The rail may include chamfered edges that form lead-in surfaces and guide mating. Other types of guide features may be used in alternative embodiments, such as a pin, a tab, a groove, a slot, and the like.

In an exemplary embodiment, the pluggable optical generator module 500 includes a light source 560 (shown in phantom). The light source 560 generates light, which may be transmitted along optical fibers. The light source may be a laser generator. The light source 560 is electrically connected to the contact pads 534. In an exemplary embodiment, power is supplied to the light source 560 via the contact pads 534. Control signals may be transmitted to the light source 560 via the contact pads 534.

In an exemplary embodiment, the pluggable optical generator module 500 includes one or more supply optical connectors 570. The supply optical connectors 570 are communicatively coupled to the light source 560. The supply optical connectors 570 receive light from the light source 560. The supply optical connectors 570 are configured to transmit the light to the optical receptacle connector 600. The supply optical connectors 570 may be coupled to the circuit board 530. Alternatively, the supply optical connectors 570 may be coupled to the plug housing 510. Optionally, the supply optical connectors 570 may be movable relative to the plug housing 510. For example, a biasing member, such as a spring, may be coupled between the supply optical connectors 570 and the plug housing 510. The biasing member allows the supply optical connectors 570 to move (for example, float) relative to the housing. The biasing member may allow floating movement along a mating axis. Each supply optical connector 570 includes a ferrule 572 holding one or more optical fibers 574. The supply optical connector 570 includes alignment features 576, such as pins, configured to interface with the mating optical connector of the optical receptacle connector 600.

Figure 19:
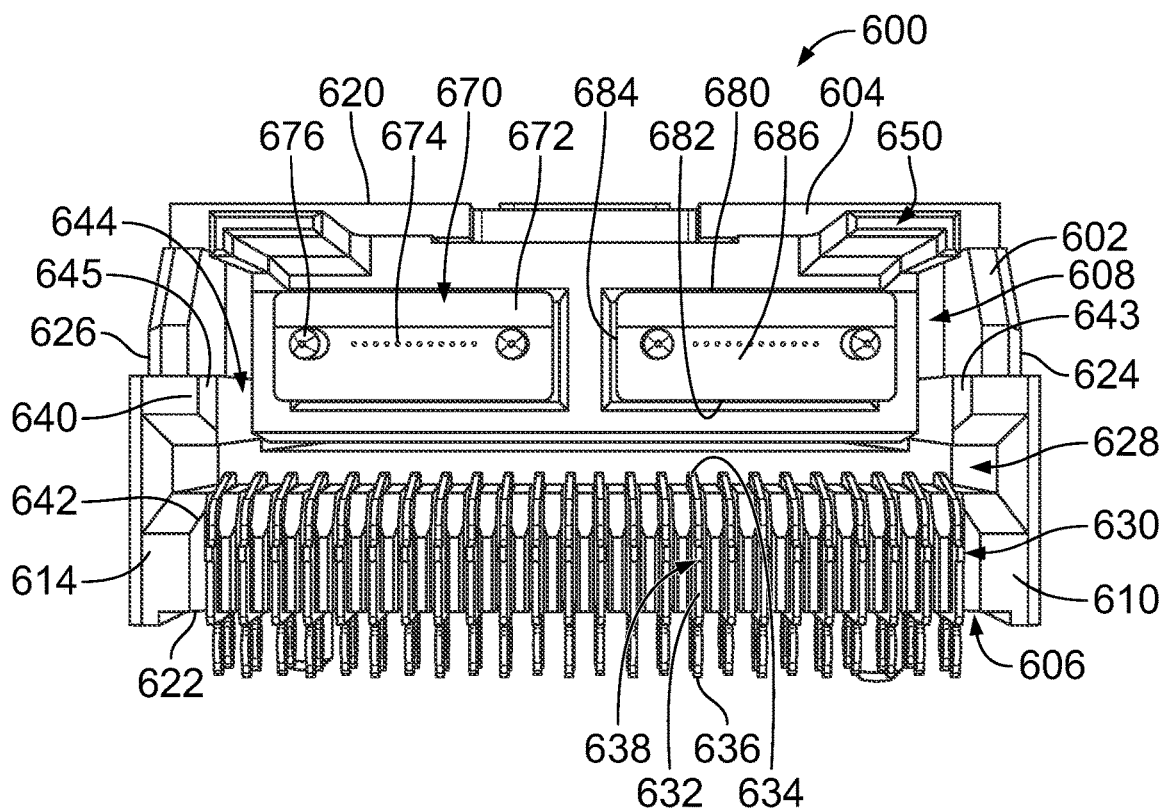
FIG. 19 is a front view of the optical receptacle connector in accordance with an exemplary embodiment.
Figure 20:
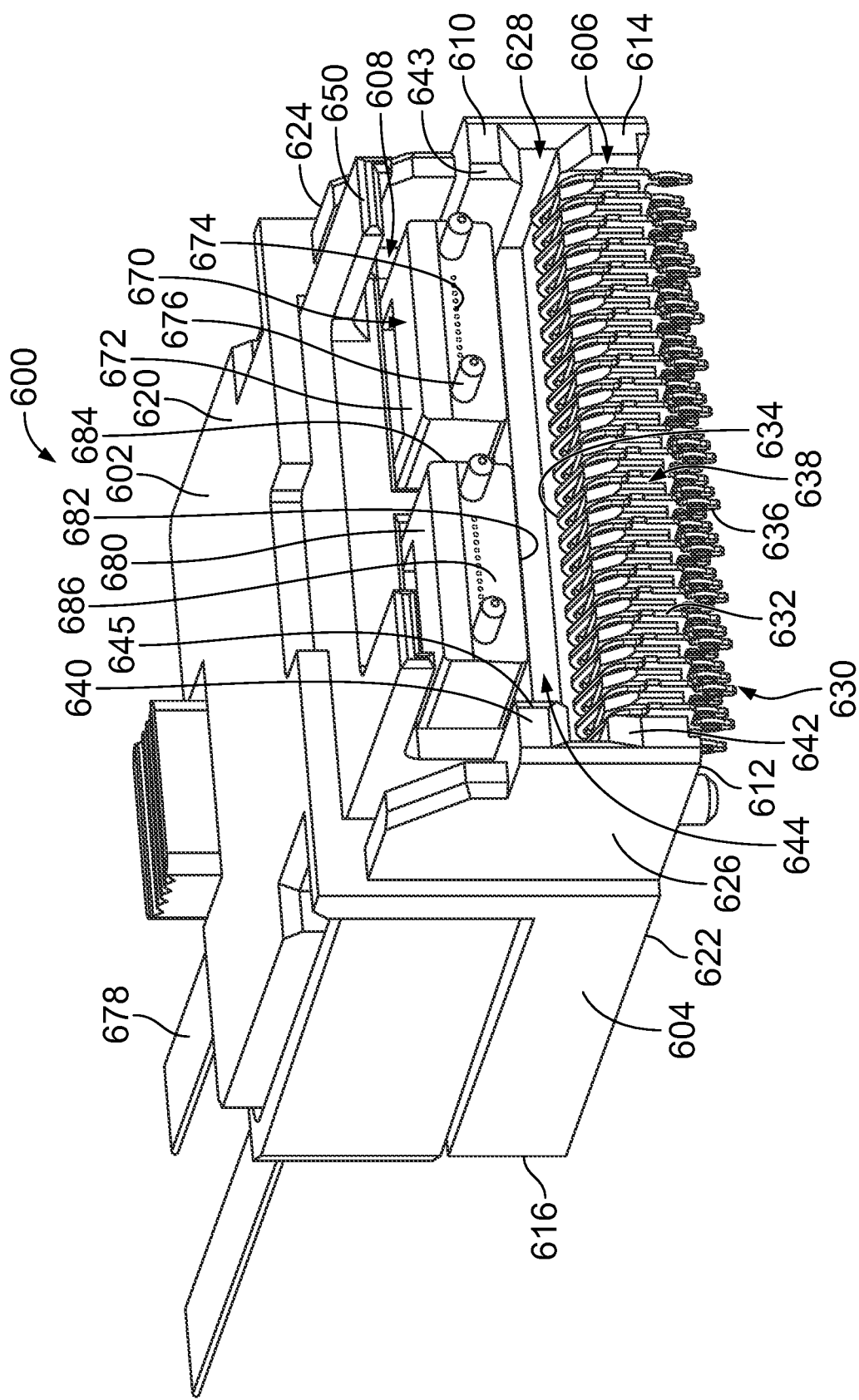
FIG. 20 is a front perspective view of the optical receptacle connector in accordance with an exemplary embodiment.
Figure 21:
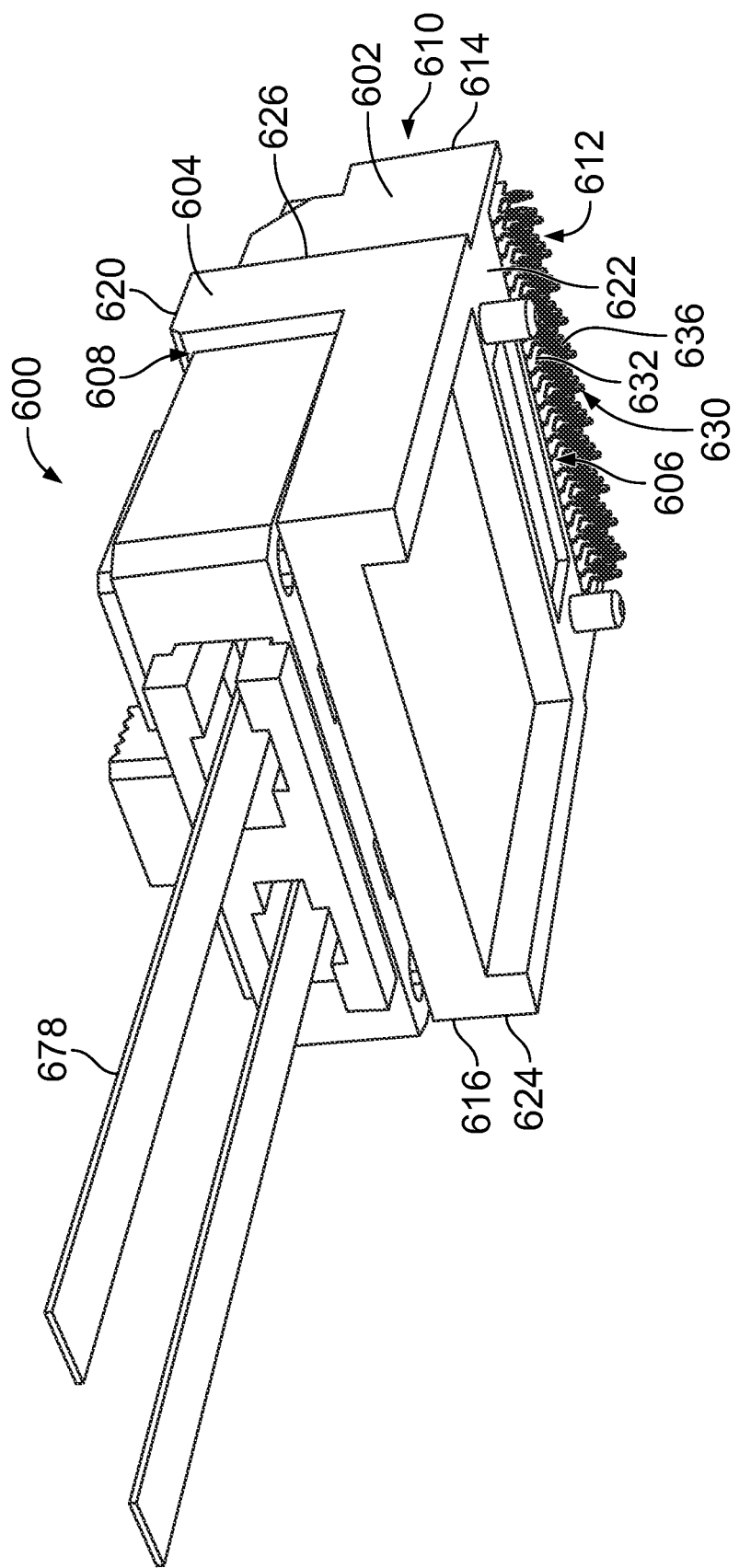
FIG. 21 is a rear perspective view of the optical receptacle connector in accordance with an exemplary embodiment.

FIG. 19 is a front view of the optical receptacle connector 600 in accordance with an exemplary embodiment. FIG. 20 is a front perspective view of the optical receptacle connector 600 in accordance with an exemplary embodiment. FIG. 21 is a rear perspective view of the optical receptacle connector 600 in accordance with an exemplary embodiment. The optical receptacle connector 600 includes a receptacle housing 602 having housing walls 604 forming at least one contact cavity 606 and at least one optical cavity 608.

The receptacle housing 602 includes a mating end 610 and a mounting end 612. The mounting end 612 is configured to be mounted to the circuit board 406 (shown in FIG. 17). The mating end 610 is used for mating with the pluggable optical generator module 500 (shown in FIG. 18). The mating end 610 may be perpendicular to the mounting end 612. For example, the mating end 610 may be at a front of the receptacle housing 602 and the mounting end 612 may be at a bottom of the receptacle housing 602. Other orientations are possible in alternative embodiments.

The receptacle housing 602 extends between a front 614 and a rear 616. In an exemplary embodiment, the receptacle housing 602 includes one or more airflow channels (not shown) through the receptacle housing 602. The airflow channels extend between the front 614 and the rear 616. The airflow channels allow cooling airflow to pass through the receptacle housing 602, such as for cooling components of the optical receptacle connector 600 and/or for cooling the pluggable optical generator module 500.

The receptacle housing 602 includes a top wall 620, a bottom wall 622, a first side wall 624 extending between the top wall 620 and the bottom wall 622, and a second side wall 626 extending between the top wall 620 and the bottom wall 622. In various embodiments, the top wall 620 and/or the bottom wall 622 and/or the side walls 624, 626 may be stepped walls (for example, non-planar). In the illustrated embodiment, the contact cavity 606 is located near the bottom of the receptacle housing 602 and the optical cavity 608 is located near the top of the receptacle housing 602. Other orientations are possible in alternative embodiments. In an exemplary embodiment, the receptacle housing 602 includes a card slot 628 at the front 614. The card slot 628 is configured to receive the mating edge 532 of the optical module circuit board 530 to electrically connect the pluggable optical generator module 500 with the optical receptacle connector 600.

In an exemplary embodiment, the optical receptacle connector 600 includes a contact assembly 630 coupled to the receptacle housing 602. The contact assembly 630 is received in the contact cavity 606. The contact assembly 630 includes a plurality of receptacle contacts 632. In an exemplary embodiment, the contacts 632 extend into the card slot 628 for mating with the optical module circuit board 530. Each contact includes a mating end 634 and a terminating end 636 opposite the mating end 634. The mating end 634 is configured to be mated with the optical module circuit board 530. For example, the mating end 634 extends to the mating end 610, such as into the card slot 628. The terminating end 636 is configured to be terminated to the circuit board 406. For example, the terminating end 636 extends to the mounting end 612, such as at the bottom. One or more of the receptacle contacts 632 may be power contacts configured to transmit or supply power, such as from the circuit board 406 to the optical module circuit board 530. The power supplied to the optical module circuit board 530 is used to power the light source 560 (shown in FIG. 18). One or more of the receptacle contacts 632 may be signal contacts configured to transmit data signal between the circuit board 406 and the optical module circuit board 530.

In an exemplary embodiment, the receptacle contacts 632 are stamped and formed contacts. The receptacle contacts 632 include spring beams at the mating end 634 and pins, such as compliant pins, or tails, such as solder tails, at the terminating end 636 for termination to the circuit board 406. In an exemplary embodiment, the receptacle housing 602 includes contact channels 638 that receive the receptacle contacts 632. The contact channels 638 of the receptacle housing 602 hold relative positions of the receptacle contacts 632, such as spacing between the receptacle contacts 632. The receptacle housing 602 may position the spring beams relative to each other and the pins/tails relative to each other. In alternative embodiments, the contact assembly 630 may include a contact holder (not shown) separate from the receptacle housing 602 that holds the receptacle contacts 632. The contact holder may be loaded into the receptacle housing 602 to position the receptacle contacts 632 in the receptacle housing 602.

In an exemplary embodiment, the receptacle housing 602 includes an upper wall 640 and a lower wall 642 at the contact cavity 606. The upper wall 640 is located above the card slot 628 and the lower wall 642 is located below the card slot 628. The card slot 628 is defined between the upper and lower walls 640, 642. The card slot 628 has a width between opposite sides of the card slot 628. The receptacle contacts 632 may have a generally uniform spacing across the entire width of the card slot 628 to provide a large number of receptacle contacts 632. The mating edge 532 of the optical module circuit board 530 is configured to be received between the upper and lower walls 640, 642. The upper and lower walls 640, 642 may position the mating edge 532 of the optical module circuit board 530 in the card slot 628. In an exemplary embodiment, the upper wall 640 includes an upper wall opening 644 above the card slot 628. The upper wall opening 644 is defined between upper wall portions 643, 645. The upper wall portions 643, 645 may be used to position the optical module circuit board 530 in the card slot 628, such as to prevent upward movement of the optical module circuit board 530. In an exemplary embodiment, the lower wall 642 includes the contact channels 638 that hold the receptacle contacts 632 used to interface with the lower surface of the optical module circuit board 530. Optionally, all of the receptacle contacts 632 may be arranged below the card slot 628, such as in the lower wall 642. However, in alternative embodiments, the upper wall portions 643, 645 may additionally include contact channels 638 holding corresponding receptacle contacts 632, such as to interface with the upper surface of the optical module circuit board 530.

In an exemplary embodiment, the optical receptacle connector 600 includes a guide feature 650. The guide feature 650 is used to guide mating with the pluggable optical generator module 500. For example, the guide feature 650 interfaces with the guide feature 550 (shown in FIG. 18) of the pluggable optical generator module 500 to position the pluggable optical generator module 500 relative to the optical receptacle connector 600. In the illustrated embodiment, the guide feature 650 is a groove or slot extending along the side walls 624, 626. The groove may include lead-in surfaces to guide loading of the guide features 550 (for example, rails) into the grooves. Other types of guide features may be used in alternative embodiments, such as a pin, a tab, a rail, and the like. The guide feature 650 may be used to vertically position and/or horizontally position the pluggable optical generator module 500 relative to the optical receptacle connector 600. The guide feature 650 may be used to prevent rotation of the pluggable optical generator module 500 relative to the optical receptacle connector 600.

In an exemplary embodiment, the optical receptacle connector 600 includes one or more receive optical connectors 670. The receive optical connector 670 is received in the corresponding optical cavity 608. In the illustrated embodiment, the optical cavity 608 is located above the card slot 628 to position the receive optical connector 670 above the card slot 628 and above the receptacle contacts 632. The receive optical connector 670 may be located above the upper wall opening 644. Optionally, a portion of the receive optical connector 670 may extend into the upper wall opening 644. The upper wall opening 644 allows the receive optical connector 670 to be located closer to the receptacle contacts 632 compared to an embodiment without the upper wall opening 644. As such, the optical receptacle connector 600 may have a lower profile by providing the upper wall opening 644 compared to an embodiment having a full upper wall and thus having the receive optical connectors 670 shifted upward making the optical receptacle connector taller.

The receive optical connector 670 may be coupled to the housing walls 604 to position the receive optical connector 670 relative to the receptacle housing 602 and/or relative to the contact assembly 630 for mating with the pluggable optical generator module 500. Optionally, the receive optical connector 670 may be movable relative to the receptacle housing 602. For example, a biasing member, such as a spring, may be coupled between the receive optical connector 670 and the receptacle housing 602. The biasing member allows the receive optical connector 670 to move (for example, float) relative to the receptacle housing 602. The biasing member may allow floating movement along a mating axis. The receive optical connectors 670 are configured to be communicatively coupled with the supply optical connectors 570 (shown in FIG. 18). The receive optical connectors 670 receive optical signals from the supply optical connectors 570.

In the illustrated embodiment, the optical receptacle connector 600 includes two receive optical connectors 670 received in the receptacle housing 602. The receive optical connectors 670 may be received in different optical cavities 608. Alternatively, the receive optical connectors 670 may be received in a common optical cavity 608. Optionally, the optical receptacle connector 600 may include an optical connector support housing (not shown) that holds the receive optical connectors 670 relative to each other, which is loaded into the optical cavity 608 and coupled to the receptacle housing 602 to position the receive optical connectors 670 relative to the receptacle housing 602. The pair of receive optical connectors 670 are located above the card slot 328. In an exemplary embodiment, the upper wall opening 644 has a width at least as wide as the optical cavity(ies) 608. Optionally, a portion of each receive optical connector 670 may be located in the upper wall opening 344.

Each receive optical connector 670 includes a ferrule 672 holding one or more optical fibers 674. The receive optical connector 670 includes alignment features 676, such as openings, configured to interface with the alignment features 576 (shown in FIG. 18) of the pluggable optical generator module 500 to align the supply optical connector 570 with the receive optical connector 670. The receive optical connector 670 includes an optical cable 678 extending from the ferrule 672. The optical fibers 674 extend along the optical cable 678.

The ferrule 672 of the receive optical connector 670 includes a top wall 680 and a bottom wall 682 with side walls 684 extending therebetween. A front 686 of the ferrule 672 defines a mating interface of the receive optical connector 670. The bottom wall 682 faces the receptacle contacts 632 across the card slot 628 and the upper wall opening 644. Optionally, the ferrule 672 of the receive optical connector 670 extends into the upper wall opening 644. In various embodiments, the bottom wall 682 may be located in the upper wall opening 644. For example, the bottom wall 682 is lower than a top of the upper wall portions 643, 645. In various embodiments, portions of the side walls 684 may be located in the upper wall opening 644 and face the upper wall portions 643, 645. In an exemplary embodiment, the top wall 680 of the ferrule 672, and portions of the side walls 684 are located above the upper wall opening 644.

Returning to FIG. 17, the optical receptacle connector 600 is located in the receptacle cage 420, such as at the rear end of the receptacle cage 420. The receptacle contacts 632 of the optical receptacle connector 600 are electrically connected to the circuit board 406. The optical cables 678 extend rearward from the optical receptacle connector 600 and may be routed to another component remote from the receptacle module 402. During use, the pluggable optical generator module 500 is pluggable into the receptacle cage 420 to mate with the optical receptacle connector 600 at a separable mating interface. When mated, electrical power is supplied from the optical receptacle connector 600, through the receptacle contacts 632, to the pluggable optical generator module 500. The power is used to operate the light source 560 of the pluggable optical generator module 500, which generates optical signals. The optical signals are transmitted to the receive optical connectors 670 and the optical signals are transmitted form the receive optical connectors 670 through optical cables 678.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An optical receptacle connector for an optical communication system comprising:
a receptacle housing having housing walls defining a contact cavity and an optical cavity, the receptacle housing including an upper wall and a lower wall at a front of the receptacle housing defining a card slot configured to receive a mating edge of an optical module circuit board of a pluggable optical generator module, the upper wall including an upper wall opening above the card slot;
a contact assembly coupled to the receptacle housing, the contact assembly including receptacle contacts received in the contact cavity, the receptacle contacts extending into the card slot to electrically connect to the optical module circuit board of the pluggable optical generator module, the receptacle contacts configured to supply power to the pluggable optical generator module to operate a light source of the pluggable optical generator module; and
a receive optical connector coupled to the receptacle housing, the receive optical connector positioned above the upper wall opening, the receive optical connector including a ferrule holding at least one optical fiber, the ferrule having a mating end configured to be mated with a supply optical connector of the pluggable optical generator module to receive optical signals from the supply optical connector, the receive optical connector including an optical cable extending from the ferrule.

2. The optical receptacle connector of claim 1, wherein the receive optical connector extends into the upper wall opening.

3. The optical receptacle connector of claim 1, wherein the receptacle contacts are located in the card slot vertically below the receive optical connector.

4. The optical receptacle connector of claim 1, wherein the card slot extends between a first side and a second side, the card slot having a width between the first and second sides, the receptacle contacts having generally uniform spacing across the entire width of the card slot.

5. The optical receptacle connector of claim 1, wherein the upper opening has a width at least as wide as the optical cavity.

6. The optical receptacle connector of claim 1, wherein the optical cavity is located above the contact cavity.

7. The optical receptacle connector of claim 1, wherein the receive optical connector includes a biasing member coupled between the ferrule and the receptacle housing to allow the floating movement of the receive optical connector relative to the receptacle housing.

8. The optical receptacle connector of claim 1, wherein the receptacle housing includes an airflow channel allowing cooling airflow through the receptacle housing.

9. The optical receptacle connector of claim 1, wherein the receive optical connector is a first receive optical connector, the optical receptacle connector further comprising a second receive optical connector.

10. The optical receptacle connector of claim 9, further comprising an optical connector support housing holding the first receive optical connector and the second receive optical connector, the optical connector support housing received in the optical cavity.

11. The optical receptacle connector of claim 1, wherein the receptacle contacts include receptacle power contacts each having a mating end and a terminating end, the terminating end electrically connected to a host circuit board and receiving a power supply from the host circuit board, the mating end being connected to the optical module circuit board to supply power to the pluggable optical generator module.

12. The optical receptacle connector of claim 1, wherein the receptacle housing includes a guide feature configured to interface with the pluggable optical generator module to position the pluggable optical generator module relative to the receptacle housing to align the supply optical connector with the receive optical connector.

13. The optical receptacle connector of claim 12, wherein the guide feature includes a guide slot configured to receive a guide rail of the pluggable optical generator module.

14. The optical receptacle connector of claim 12, wherein the guide feature positions the pluggable optical generator module in a vertical direction perpendicular to a mating direction and the guide feature positions the pluggable optical generator module in a lateral direction perpendicular to the mating direction and perpendicular to the vertical direction.

15. An optical receptacle connector for an optical communication system comprising:
a receptacle housing having housing walls defining a contact cavity and an optical cavity, the receptacle housing including an upper wall and a lower wall at a front of the receptacle housing defining a card slot configured to receive a mating edge of an optical module circuit board of a pluggable optical generator module, the upper wall including an upper wall opening above the card slot;
a contact assembly coupled to the receptacle housing, the contact assembly including receptacle contacts received in the contact cavity, the receptacle contacts extending into the card slot to electrically connect to the optical module circuit board of the pluggable optical generator module, the receptacle contacts configured to supply power to the pluggable optical generator module to operate a light source of the pluggable optical generator module; and
a receive optical connector coupled to the receptacle housing, the receive optical connector including a top and a bottom, the receive optical connector positioned above the card slot with the bottom of the receive optical connector facing the contacts across the upper wall opening and the card slot, the receive optical connector including a ferrule holding at least one optical fiber, the ferrule having a mating end configured to be mated with a supply optical connector of the pluggable optical generator module to receive optical signals from the supply optical connector, the receive optical connector including an optical cable extending from the ferrule.

16. The optical receptacle connector of claim 15, wherein the receptacle contacts are located in the card slot vertically below the receive optical connector.

17. The optical receptacle connector of claim 15, wherein the card slot extends between a first side and a second side, the card slot having a width between the first and second sides, the receptacle contacts having generally uniform spacing across the entire width of the card slot.

18. A communication system comprising:
a receptacle cage having cage walls defining a module channel, the module channel extending between a front end and a rear end of the receptacle cage, the module channel being open at the front end to receive a pluggable optical generator module; and
an optical receptacle connector located in the module channel for electrical and optical connection with the pluggable optical generator, the optical receptacle connector including a receptacle housing holding a contact assembly and a receive optical connector;
the receptacle housing includes housing walls defining a contact cavity and an optical cavity, the receptacle housing including an upper wall and a lower wall at a front of the receptacle housing defining a card slot at a front of the receptacle housing configured to receive a mating edge of an optical module circuit board of the pluggable optical generator module, the upper wall including an upper wall opening above the card slot;
the contact assembly includes receptacle contacts received in the contact cavity of the receptacle housing, the receptacle contacts extending into the card slot to electrically connect to the optical module circuit board of the pluggable optical generator module, the receptacle contacts configured to supply power to the pluggable optical generator module to operate a light source of the pluggable optical generator module; and
the receive optical connector includes a ferrule received in the optical cavity of the receptacle housing, the ferrule holds at least one optical fiber, the ferrule having a mating end configured to be mated with a supply optical connector of the pluggable optical generator module to receive optical signals from the supply optical connector, the receive optical connector including an optical cable extending from the ferrule;
wherein the receive optical connector is positioned above the upper wall opening.

19. The communication system of claim 18, wherein the receptacle housing includes an airflow channel allowing cooling airflow through the receptacle housing, the airflow channel being in flow communication with the module channel.

20. The communication system of claim 18, wherein the receptacle housing includes a guide feature configured to interface with the pluggable optical generator module to position the pluggable optical generator module relative to the receptacle housing in the module channel to align the supply optical connector with the receive optical connector.

* * * * *